United States Patent

(10) Patent No.: US 8,624,881 B2
(45) Date of Patent: Jan. 7, 2014

Sakamoto

(54) IMAGE DISPLAY CONTROL DEVICE, IMAGE DISPLAY DEVICE, IMAGE DISPLAY CONTROL METHOD, AND IMAGE DISPLAY CONTROL PROGRAM

(75) Inventor: Michiaki Sakamoto, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 268 days.

(21) Appl. No.: 12/980,040

(22) Filed: Dec. 28, 2010

(65) Prior Publication Data

US 2011/0157256 A1    Jun. 30, 2011

(30) Foreign Application Priority Data

Dec. 28, 2009 (JP) ................................ 2009-298047

(51) Int. Cl.
G06F 3/038 (2013.01)
G09G 5/00 (2006.01)

(52) U.S. Cl.
USPC .......................................... 345/204; 345/107

(58) Field of Classification Search
None
See application file for complete search history.

(56) References Cited

U.S. PATENT DOCUMENTS

| | | | |
|---|---|---|---|
| 6,539,055 B1 * | 3/2003 | Hazra | 375/240.16 |
| 8,228,263 B2 * | 7/2012 | Ikeno et al. | 345/4 |
| 2006/0139305 A1 * | 6/2006 | Zhou et al. | 345/107 |
| 2006/0187185 A1 * | 8/2006 | Yoshinaga et al. | 345/107 |
| 2008/0111787 A1 * | 5/2008 | Jung et al. | 345/107 |
| 2009/0122207 A1 * | 5/2009 | Inoue et al. | 348/739 |
| 2009/0184909 A1 * | 7/2009 | Takeda | 345/87 |

FOREIGN PATENT DOCUMENTS

| | | |
|---|---|---|
| JP | 2217893 A | 8/1990 |
| JP | 419787 A | 1/1992 |
| JP | 527705 A | 2/1993 |
| JP | 9319341 A | 12/1997 |
| JP | 2002-116733 A | 4/2002 |
| JP | 2002-116734 A | 4/2002 |
| JP | 2004-101746 A | 4/2004 |
| JP | 200684758 A | 3/2006 |
| JP | 2007-163987 A | 6/2007 |
| JP | 2007-249230 A | 9/2007 |
| JP | 2007-530984 A | 11/2007 |
| JP | 2008-158162 A | 7/2008 |
| JP | 2009-092906 A | 4/2009 |
| JP | 2009192648 A | 8/2009 |
| WO | 2005/006294 A1 | 1/2005 |
| WO | WO 2005006294 A1 * | 1/2005 ............... G09G 3/34 |

OTHER PUBLICATIONS

Office Action, dated Mar. 19, 2013, issued by the State Intellectual Property Office of the People's Republic of China in counterpart Chinese Application No. 2009-298047.

* cited by examiner

*Primary Examiner* — James Wozniak
*Assistant Examiner* — Antonio Xavier
(74) *Attorney, Agent, or Firm* — Sughrue Mion, PLLC

(57) ABSTRACT

To display an image on an electronic paper display properly, even when image data is transmitted continuously from a host of the existing LCD display system, for example. A sampling section inputs a single image data by each prescribed period from a plurality of pieces of continuously transmitted image data corresponding to one screen of the electronic paper display. A difference detecting section detects a difference amount showing a difference between previous image data and latter image data of two pieces of consecutive image data inputted by the sampling section, and determines to perform screen update by using the latter image data when the difference value is equal to or larger than a threshold value. A driving section generates a driving signal of the latter image data and outputs the signal to the electronic paper display, when the screen update is determined by the difference detecting section.

5 Claims, 15 Drawing Sheets

|  | PREVIOUS IMAGE DATA (C) | |
|---|---|---|
|  | B | W |
| UPDATE IMAGE DATA (N)  B | WF11 | WF12 |
| W | WF21 | WF22 |

WF11,WF12,WF21,WF22 ="00"or"10"or"01"

IMAGE DISPLAY CONTROL DEVICE, IMAGE DISPLAY DEVICE, IMAGE DISPLAY CONTROL METHOD, AND IMAGE DISPLAY CONTROL PROGRAM

CROSS-REFERENCE TO RELATED APPLICATION

This application is based upon and claims the benefit of priority from Japanese patent application No. 2009-298047, filed on Dec. 28, 2009, the disclosure of which is incorporated herein in its entirety by reference.

BACKGROUND OF THE INVENTION

1. Field of the Invention

The present invention relates to an image display control device and the like, which output screen display driving signals to an electronic paper display that displays a refresh screen before updating and displaying the screen.

2. Description of the Related Art

As a measure for displaying contents, recently, a contents display device for substituting paper has been socially demanded. Examples of such contents display device are a browser terminal having a display screen of A5 to A4 size with which news updated on time (e.g., latest newspaper contents automatically distributed from a server) can be viewed, and a large-scaled advertisement bulletin board having a display screen of A2 to A1 size or larger put up in train stations and the like. Such contents display devices are required to exchange contents by being radio-connected to a server and to operate in low power consumption without imposing a load on environments by receiving supply of power from a secondary battery, a solar battery, and the like.

In this case, it is desirable to structure the contents display device with a display of a large screen having a high-definition memory characteristic and a display circuit of low power consumption with a small number of components. For example, a contents display device called a book viewer Kindle, which is a product of Amazon.com.Inc., carries an A6-size electronic paper display having the resolution of SVGA (Super Video Graphics Array, 800×600 pixels) using a microcapsule-type electrophoresis display element that is a product of E Ink Corporation of US. This product has a function capable of radio-connecting to contents servers via the Internet, and books, blogs, newspapers, magazines, and the like are directly downloaded and displayed on the electronic paper display online without using a personal computer.

FIG. 15 is a schematic sectional view showing a display unit of an electronic paper display of this kind Hereinafter, explanations will be provided by referring to this drawing.

This electronic paper display uses a microcapsule-type electrophoresis display element. A display unit 80 is formed by laminating a TFT (Thin Film Transistor) glass substrate 81, an electrophoresis element film 82, and a counter substrate 83. TFTs 84 as switching elements and pixel electrodes 85 connected to the TFTs 84 are provided on the TFT glass substrate 81. In the electrophoresis element film 82, microcapsules 87 of about 40 μm are spread all over inside a polymer binder 86. A solvent 88 is impregnated inside the micro capsules 87, and an infinite number of negatively charged white pigments 89 and positively charged black pigments 90 in a nano-level size float in the solvent 88. In the counter substrate 83, a counter electrode 91 for giving a reference potential is formed.

In the display section 80, a voltage corresponding to image data is applied between the pixel electrode 85 and the counter electrode 91, so that the white pigments 89 and the black pigments 90 move up and down. For example, provided that the counter electrode 91 side is the display screen, when a positive voltage is applied to the pixel electrode 85, the negatively charged white pigments 89 move close to the pixel electrode 85. Thus, black is displayed. In the meantime, when a negative voltage is applied to the pixel electrode 85, the positively charged black pigments 90 move close to the pixel electrode 85. Thus, white is displayed. Further, the electrophoresis display element has the memory characteristic. Therefore, a negative voltage is applied when switching the pixel data of an image from white to black, while applying a positive voltage when switching the pixel data from black to white. Further, when displaying the pixel data from white to white and from black to black, "0 V" is to be applied. That is, for driving the electronic paper display, the signal voltage to be applied to the electrophoresis display element is determined by comparing a previous screen with a next screen.

Next, a general explanation of the electronic paper display using the electrophoresis display element will be provided.

With an active-matrix type display device such as a liquid crystal display device, normally, the whole image on one frame is switched by having 1/60 (=16.6) ms (milliseconds) as one frame. In the meantime, with the electronic paper display using the electrophoresis display element, the response speed of the electrophoresis display element is slow. Thus, the screen cannot be switched unless the voltage is continuously applied over a plurality of frame periods. Therefore, pulse width modulation (PWM) drive, which continuously apply a certain voltage for a plurality of frame periods, is conducted. The driving waveform in the pulse width modulation drive is determined with a lookup table based on previous screen data and update screen data. Then, a plurality of data frames are generated with the lookup table, and the pixel array of the electrophoresis display elements is addressed based on the data frames.

It becomes possible to make selections from a two-value monochrome update mode, a multi-value gradation update mode, and the like by preparing a plurality of lookup tables. Note here that the monochrome update mode is used for an electrophoresis display element having two important optical states such as black and white, and it is suited for displaying typed characters and lines, for example. An image update period under the monochrome update mode is in an order of 400 ms, since the transition time by an electrophoresis ink (pigment) is relatively long. The gradation update mode requires more time for properly writing a prescribed gradation level on the display unit. For the image update period under the gradation update mode, about 1000 ms is required in a case of four gradation levels, i.e., white, light gray, dark gray, and black, for example.

As an example of a driving method of the above-described electronic paper display, there is a driving method of a bistable electronic optical display depicted in Japanese Unexamined Patent Publication 2007-249230 (Patent Document 1). This method includes a stage of accepting drawing information of a keyboard, a touch screen, a pointer, or the like and determining at least one drawing mode waveform based on the drawing information, and a stage of addressing the pixel array of the electrophoresis display element based on the drawing information and the drawing mode waveform.

That is, in the case disclosed in Patent Document 1, a drawing mode of an electronic paper controller is determined based on the drawing information transmitted from a host such as a CPU (Central Processing Unit), and update of the drawing is conducted thereby. More specifically, the host such as the CPU transmits the pixel information such as the lookup table (data frame time, information regarding drawing, driving waveform, and the like), image data (keyboard input, drawing input, pointer input, or the like), etc., to an electronic paper controller. Then, the electronic paper display updates the screen based on the pixel information.

Further, Japanese Unexamined Patent Publication 2004-101746 (Patent Document 2) discloses a case of determining update timings of image data by using a timer for reducing the load of a CPU in an electronic paper display. Japanese Unexamined Patent Publication 2007-163987 (Patent Document 3) discloses a case of displaying a refresh screen before updating and displaying a screen in an electronic paper display.

Japanese Unexamined Patent Publication 2002-116733 (Patent Document 4: see paragraph 0095) and Japanese Unexamined Patent Publication 2002-116734 (Patent Document 5: see paragraph 0114) disclose a technique which updates a screen by applying a prescribed voltage to pixel electrodes in a period according to a difference between a gradation to be displayed next and a current gradation in an electrophoresis display device.

Japanese Unexamined Patent Publication 2008-158162 (Patent Document 6: see Abstract) discloses a technique which invalidates motion compensation between an n-th frame and an (n+1)-th frame in a case where an image of an (n−1)-th frame and an image of the n-th frame are substantially the same in an image display device.

Japanese Unexamined Patent Publication 2009-092906 (Patent Document 7: see Abstract) discloses a technique which suppresses flickers generated due to switching of the polarities in a liquid crystal display device through controlling not to invert the polarity of the liquid crystal driving voltage, when the number of counted the time (the difference between index values of two consecutive frames reaches a threshold value) exceeds a prescribed value.

Japanese Unexamined Patent Publication 2007-530984 (Patent Document 8: see Abstract) discloses a technique which suppresses power consumption of an electrophoresis display panel through updating only sub-groups of pixels that display a gray scale of a current image frame, which is different from a gray scale displayed on a previous image frame.

Incidentally, there is a market where an electronic paper display is used for a character display board which displays "hold breath", etc., when taking an X-ray, and displays directions for the casts in TV stations, for example. In such market, there already exists a system for enabling displays on an LCD (Liquid Crystal Display). Thus, it is required to enable displays on an electronic paper display without changing the existing LCD display system.

In that case, the host such as the CPU does not transmit image data at the timing where the screen of the electronic paper display switches. The host continuously transmits the image data in the same manner as the case of transmitting the image data to the LCD, and the electronic paper controller receives the transmitted image data. At this time, as depicted in Patent Document 2, it is assumed that the electronic paper controller captures or samples the image data and updates the screen in a prescribed period. In that case, the screen of the electronic paper display becomes switched in a blinking manner because the electronic paper display displays an update screen after inserting a refresh screen configured with a black display or a white display to a previous screen. As a result, even the screens of the same display content are switched in a blinking manner in a prescribed period. Thus, in the above-described case, for example, the user may misunderstand the instruction to "hold breath" once again.

Therefore, with the electronic paper display, an algorithm for judging whether or not to rewrite the screen is required in addition to capturing and sampling the screen data in a prescribed period for the image data inputted continuously. Further, regarding whether or not to perform rewriting, it is preferable to be able to autonomously select each of the driving modes by automatically detecting whether it is screen update for a movement like a moving picture of a mouse or screen update for a sill picture, since there is a case that requires a movement like a moving picture of the mouse or the like depending on the usages.

The reason for selecting the moving-picture screen update and the still-picture screen update in the electronic paper display is as follows. In a case of the moving-picture screen update by keyboard input, drawing input, pointer input, or the like, required is a relatively short image update time. That is, it is important for the visibility to instantly update the drawing, the typing characters, and the like. Thus, it is necessary to execute the update in a shorter time than the time length of 400 ms to 1000 ms, which is the typical update speed of the electronic paper display. Therefore, the instant responsiveness (=update speed) is prior to the beautifulness and preciseness of the drawing. In the meantime, in a case of updating a text including a still picture such as a PDF file, at least 16 gradients or more is required, and gradient as well as beautifulness and preciseness of the drawing are prior to the update speed. As described, the priority items for the screen update vary for the moving-picture screen update and the still-picture update, and it is necessary to switch the driving mode based thereupon.

As described above, it is presupposed that the image is updated in the electronic paper display of the related technique by a request from the host (CPU). Thus, a special update signal is required when using an existing LCD display system. However, there is no such consideration being taken. Therefore, when the electronic paper display is to be connected to the existing LCD display system without applying a major change to the system, the screen becomes switched in a prescribed period according to the image data transmitted continuously. Thus, even when the same information is being displayed, the user may misunderstand that new information is displayed.

Therefore, it is preferable for the electronic paper display to autonomously judge whether or not to update the screen and whether to perform the moving-picture screen update or the still-picture screen update. However, there is no related technique which discloses with what algorithm the image data is captured and sampled, and the screen is rewritten in regards to the image data transmitted continuously.

It is therefore an exemplary object of the present invention to disclose an image display control device and the like, which can properly display an image on an electronic paper display even when the image data is transmitted continuously from a host of an existing LCD display system, for example.

SUMMARY OF THE INVENTION

The image display control device according to an exemplary aspect of the invention is characterized as an image display control device which outputs a driving signal for screen display to an electronic paper display that displays a refresh screen before updating and displaying a screen, and the image display control device includes: a sampling section that inputs one piece of image data in every prescribed period from a plurality of continuously transmitted image data which corresponds to one screen of the electronic paper display; a difference detecting section that detects a difference amount showing a difference between previous image data and latter image data of two pieces of the consecutive image data inputted by the sampling section, and determines to perform screen update by using the latter image data when the difference amount is equal to or larger than a threshold value; and a driving section that generates the driving signal for the latter image data and outputs the driving signal to the electronic paper display when the screen update is determined by the difference detecting section.

The image display control method according to another exemplary aspect of the invention is characterized as an image display control method for outputting a driving signal for screen display to an electronic paper display that displays a refresh screen before updating and displaying a screen, and the image display control method includes: inputting one piece of image data in every prescribed period from a plurality of continuously transmitted image data which corresponds to one screen of the electronic paper display; detecting a difference amount showing a difference between previous image data and latter image data of two pieces of the consecutive input image data, and determining to perform screen update by using the latter image data when the difference amount is equal to or larger than a threshold value; and generating the driving signal for the latter image data and outputting the driving signal to the electronic paper display when the screen update is determined.

The image display control program according to still another exemplary aspect of the invention is characterized as an image display control device program for causing a computer to function as a module which outputs a driving signal for screen display to an electronic paper display that displays a refresh screen before updating and displaying a screen, and the image display control program causes the computer to function as: a module that inputs one piece of image data in every prescribed period from a plurality of continuously transmitted image data which corresponds to one screen of the electronic paper display; a module that detects a difference amount showing a difference between previous image data and latter image data of two pieces of the consecutive input image data, and determines to perform screen update by using the latter image data when the difference amount is equal to or larger than a threshold value; and a module that generates the driving signal for the latter image data and outputs the driving signal to the electronic paper display when the screen update is determined.

DETAILED DESCRIPTION OF THE PREFERRED EMBODIMENTS

Figure 1:
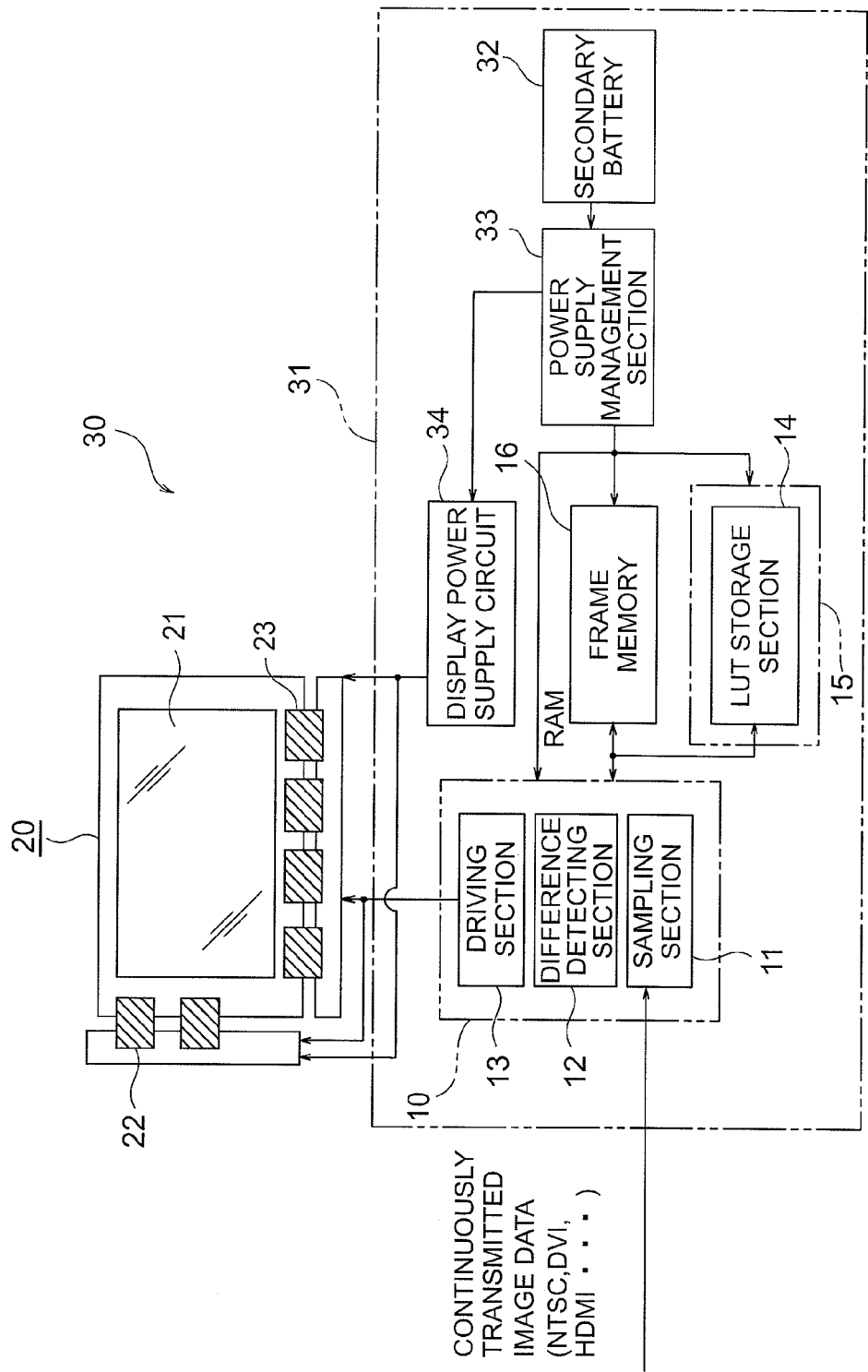
FIG. 1 is a block diagram showing the overall structure of a first exemplary embodiment.
Figure 2:
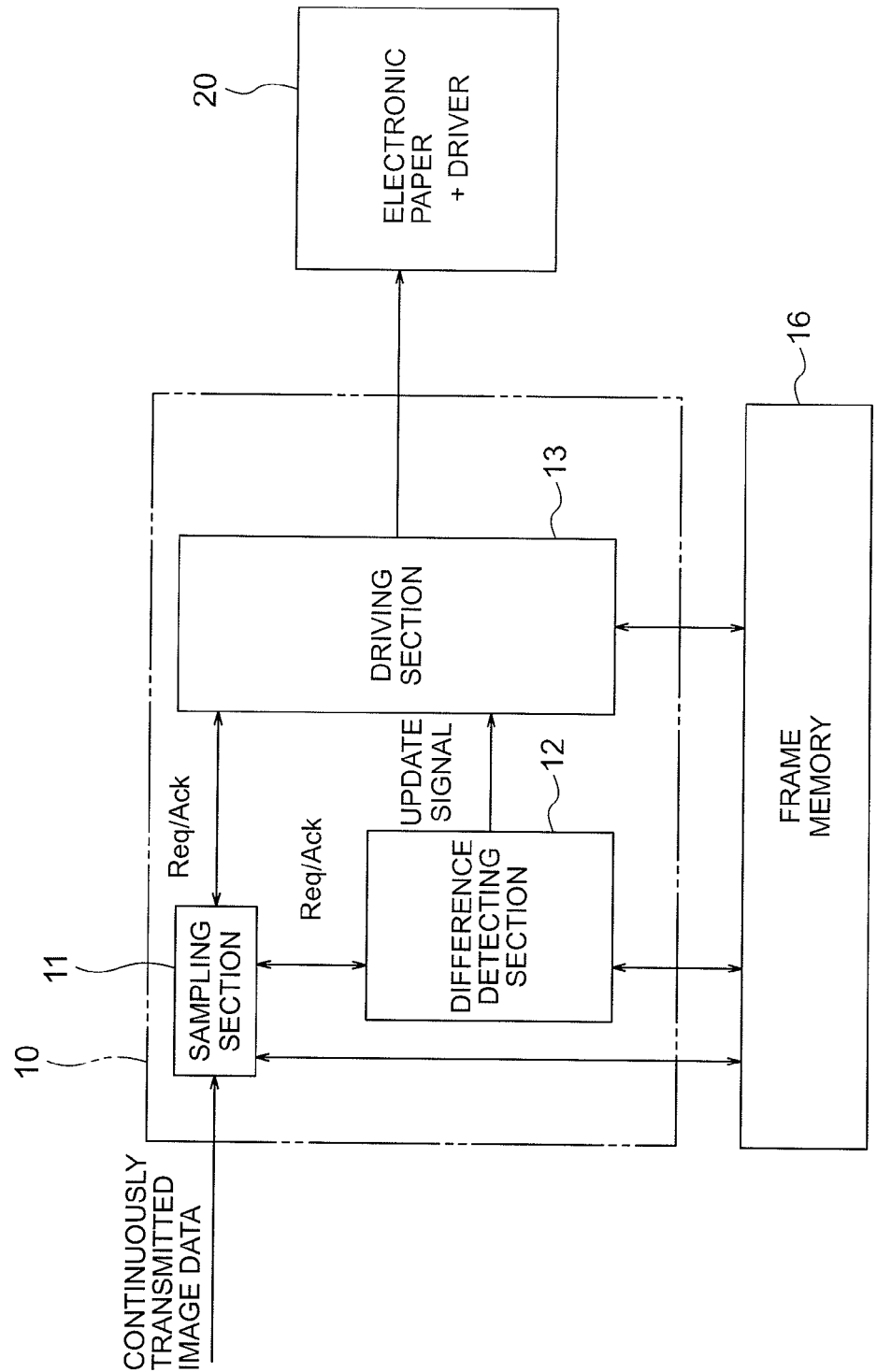
FIG. 2 is a block diagram showing a display controller of the first exemplary embodiment.

FIG. 1 is a block diagram showing the overall structure of a first exemplary embodiment. FIG. 2 is a block diagram showing a display controller of the first exemplary embodiment. Hereinafter, explanations will be provided by referring to FIG. 1 and FIG. 2.

A display controller 10 as an image display control device of the first exemplary embodiment outputs driving signals for screen display to an electronic paper display 20 which displays a refresh screen before updating and displaying a screen, and the display controller 10 includes a sampling section 11, a difference detecting section 12, and a driving section 13. The sampling section 11 inputs a single piece of image data by each prescribed period from a plurality of pieces of continuously transmitted image data corresponding to one screen of the electronic paper display 20. The difference detecting section 12 detects a difference amount showing a difference between previous image data and latter image data of two pieces of consecutive image data inputted by the sampling section 11, and determines to update screen by using the latter image data when the difference value is equal to or larger than a threshold value. The driving section 13 generates a driving signal of the latter image data and outputs the signal to the electronic paper display 20, when the screen update is determined by the difference detecting section 12. An image display control device 30 of the first exemplary embodiment includes the display controller 10 and the electronic paper display 20.

With the display controller 10, it is possible to avoid screen update by the image data that is same as the previous image data through determining to update the screen by using the latter image data when a difference amount showing the difference between two pieces of consecutively inputted image data is equal to or larger than a prescribed value. This makes it possible to prevent insertion of an unnecessary fresh screen in the electronic paper display 20, so that it is possible to dissipate such problem of displaying a same image in a blinking manner. Therefore, it is possible to display an image properly on the electronic paper display 20 even when the image data is transmitted continuously from the host of the existing LCD display system, for example.

Further, the difference detecting section 12 compares a gray scale of the previous data and a gray scale of the latter data by each pixel configuring the screen, for example, and takes the number of pixels where those two gray scales do not match with each other as the difference amount.

The display controller 10 is mounted on an electronic paper module substrate 31 along with a ROM 15 having a LUT (lookup table) storage section 14, a frame memory 16 configured with a RAM, a secondary battery 32, a power supply management section 33, a display power supply circuit 34, and the like. The electronic paper display 20 includes a display unit 21, a gate driver 22, a data driver 23, and the like.

In other words, the display controller 10 samples the image data continuously transmitted from the host (PC: Personal Computer) by every prescribed period, detects the difference amount (or movement amount) between the sampled screen and the previous screen, and compares the difference amount with a proper threshold value to make judgment to update the screen when the difference amount is equal to or larger than the threshold value and not to update the screen when the difference amount is less than the threshold value.

An image display control method of the first exemplary embodiment is an invention implemented by taking the operations of the display controller 10 as a method. That is, the image display control method of the first exemplary embodiment is the image display control method for outputting screen display driving signals to the electronic paper display 20 which displays a refresh screen before updating and displaying a screen, and the method includes following steps of (1) to (3). (1) A step which inputs a single piece of image data by every prescribed period from a plurality of pieces of continuously transmitted image data corresponding to one screen of the electronic paper display 20. (2) A step which detects a difference amount showing a difference between previous image data and latter image data of two pieces of consecutive image data, and determines to update the screen by using the latter image data when the difference value is equal to or larger than a threshold value. (3) A step which generates a driving signal of the latter image data and outputs the signal to the electronic paper display 20, when the screen update is determined.

Each function of the display controller 10 can be achieved by hardware or by software. In a case where each function of the display controller 10 is achieved by software, an image display control program of the first exemplary embodiment is used. That is, the image display control program of the first exemplary embodiment is for enabling a computer to achieve each function of the sampling section 11, the difference detecting section 12, and the driving section 13. The image display control program of the first exemplary embodiment is an image display control program for enabling a computer to function as a measure for outputting a driving signal for screen display to the electronic paper display 20 which displays a refresh screen before updating and displaying a screen, and it is for enabling the computer to function as three following measure. That is, a measure (the sampling section 11) for inputting a single piece of image data by every prescribed period from a plurality of pieces of continuously transmitted image data corresponding to one screen of the electronic paper display 20, a measure (the difference detecting section 12) for detecting a difference amount showing a difference between previous image data and latter image data of two pieces of consecutive input image data, and determining to update the screen by using the latter image data when the difference value is equal to or larger than a threshold value, and a measure (the driving section 13) for generating a driving signal of the latter image data and outputs the signal to the electronic paper display, when the screen update is determined. The computer may be in a typical structure configured with a CPU, a ROM (Read Only Memory), a RAM (Random Access Memory), a bus, an input/output interface, and the like. In this case, the CPU reads out, interprets, and executes the image display control program of the first exemplary embodiment stored in the ROM or the RAM.

The image display control method and the image display control program of the first exemplary embodiment achieve the same operations and effects as those of the display controller 10. Other structures of the image display control method and the image display control program according to the present invention follow other structures of the image display control device according to the present invention.

Figure 3:
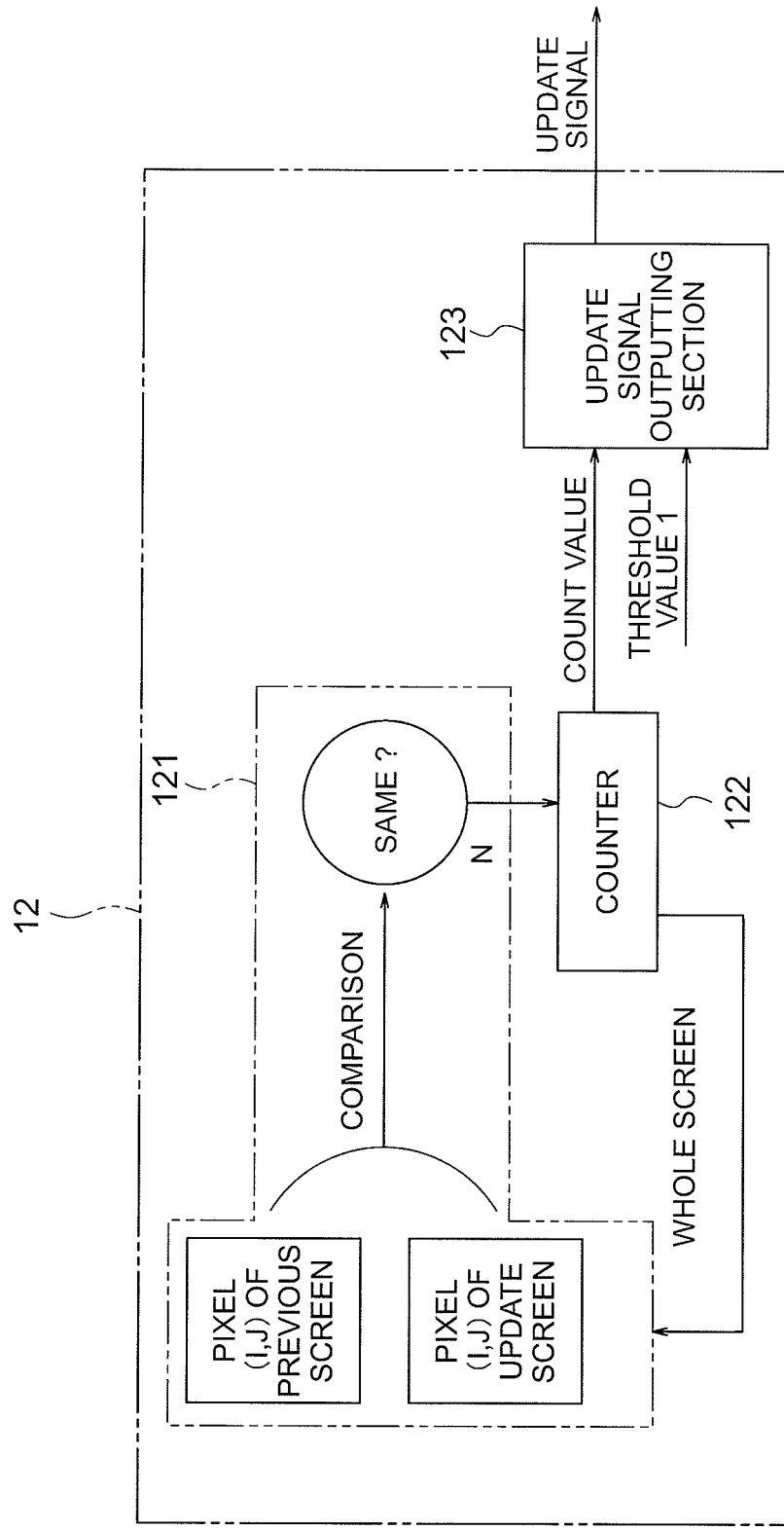
FIG. 3 is a block diagram showing a difference detecting section of the first exemplary embodiment.
Figure 4:
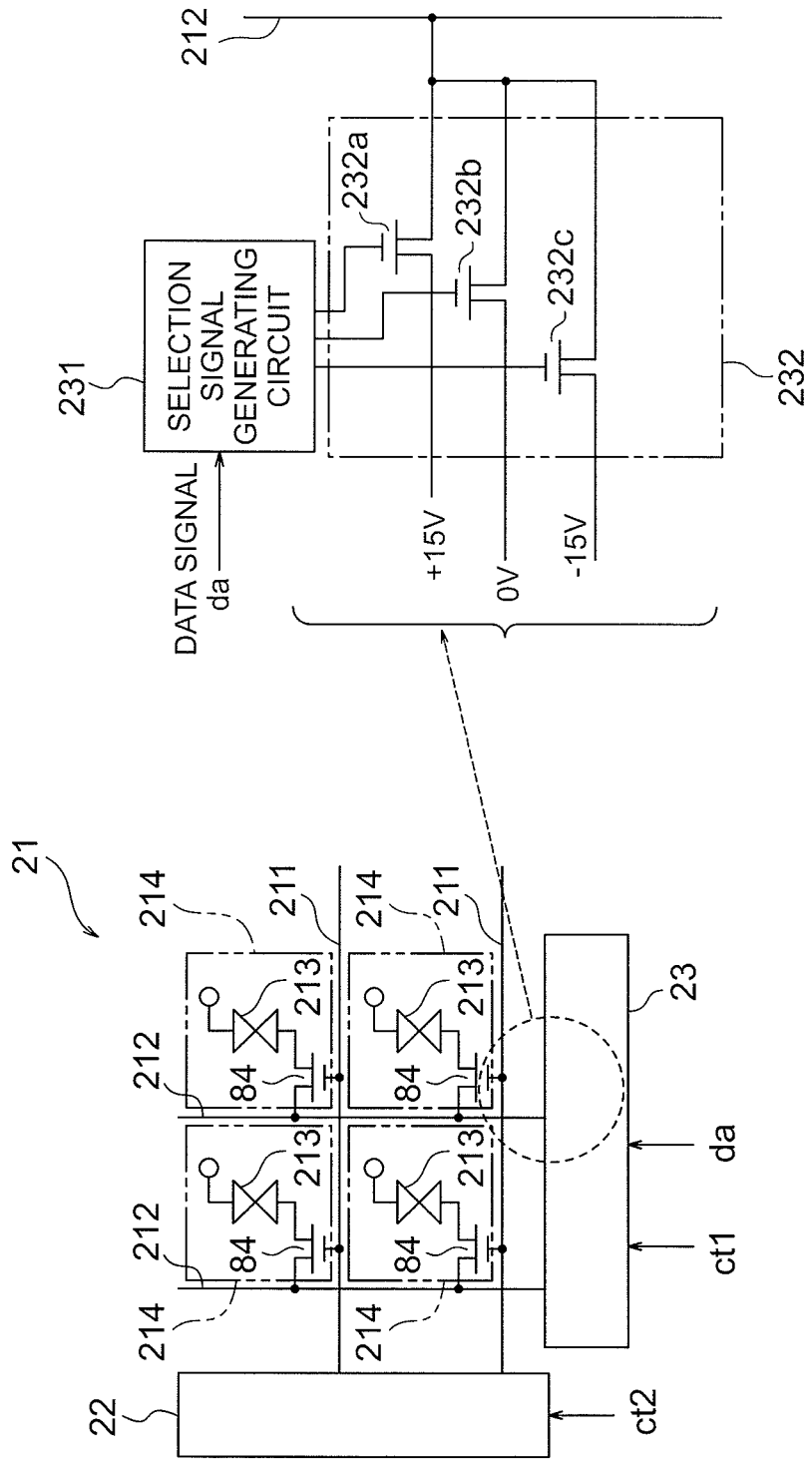
FIG. 4 is a circuit diagram showing a part of an electronic paper display of the first exemplary embodiment.

FIG. 3 is a block diagram showing the difference detecting section illustrated in FIG. 2. FIG. 4 is a circuit diagram showing a part of the electronic paper display illustrated in FIG. 1. The first exemplary embodiment will be described in more details by referring to FIG. 1-FIG. 4.

As shown in FIG. 1, the image display device 30 is configured with the electronic paper display 20 and the electronic paper module substrate 31. The electronic paper display 20 is configured with the display unit 21, a gate driver 22, and a data driver 23. The display unit 21 is a memory-type display. As shown in FIG. 4, the circuit structure of the display unit 21 is formed with data lines 212 of prescribed columns, scan lines 211 of prescribed rows, and pixels 214 provided at intersection points of each of the data lines 212 and each of the scan lines 211. Each pixel 214 is configured with an electrophoresis display element 213. In this case, the display unit 21 uses the microcapsule type electrophoresis display element 213 having the resolution of UXGA (Ultra Extended Graphics Array, 1600×1200 pixels) in A4 size, for example, and it is in a same sectional structure as that of the display unit 80 shown in FIG. 15.

As shown in FIG. 1 and FIG. 4, the data driver 23 writes the pixel data based on a data signal da (driving signal) supplied from the electronic paper module substrate 31 to each data line 212 according to a control signal ct1 (driving signal) supplied from the electronic paper module substrate 31. Particularly, in the first exemplary embodiment, the data driver 23 is configured with a three-value driver which can output +15 V, 0 V, and −15 V from two-value input data. The gate driver 22 outputs scan-line driving signals for driving each of the scan lines 211 in a prescribed order (in line sequence, for example) based on a control signal ct2 (driving signal) supplied from the electronic paper module substrate 31 as in the case of a typical LCD gate driver.

As shown in FIG. 1, the electronic paper module substrate 31 is configured with: the display controller 10; the frame memory 16 formed with a RAM; the ROM 15 having the LUT storage section 14 for storing lookup table data for determining driving waveforms; the power supply management section 33; and the like. The frame memory 16 is a storage section for storing image data (previous image data) of a previous screen and image data (latter image data) of an update screen. Continuously transmitted image data such as NTSC (National Television System Committee), DVI (Digital Video Interactive), HDMI (High Definition Multimedia Interface), and the like reach the display controller 10. The display controller 10 samples the image data, analyses the image data, and updates the display screen of the electronic paper display 20 when the currently displayed image data (previous image data) on the screen and newly sampled image data (latter image data) are different.

As shown in FIG. 2, the display controller 10 is configured with the sampling section 11, the difference detecting section 12, and the driving section 13. The sampling section 11 samples the continuously transmitted image data in 1 s (second) period, for example, and fetches the data into the frame memory 16. The difference detecting section 12 receives a Req signal from the sampling section 11, and detects the number of pixels exhibiting a difference between the fetched image data and the image data of the previous screen over the entire screen. Subsequently, the difference detecting section 12 outputs a screen update signal to the driving section 13 when the number is equal to or larger than a threshold value set in advance, but does not output the screen update signal to the driving section 13 when the number is less than the threshold value. The driving section 13 starts an operation upon receiving the update signal from the difference detecting section 12. The driving section 13 reads out the image data of the previous screen and the image data of an update image from the frame memory 16, determines the driving waveform corresponding to those image data based on the lookup table data, generates the driver data (driving signal), and generates control signals (driving signals) of the data driver 23 and the gate driver 22.

As shown in FIG. 3, the difference detecting section 12 includes a comparing section 121, a counter 122, and an update signal outputting section 123. The comparing section 121 compares a pixel (I, J) of the previous screen with a pixel (I, J) of the update screen. The pixel (I, J) indicates the pixel 214 provided at an intersection point between the I-th data line 212 and the J-th scan line 211, for example, in the case of FIG. 4. The counter 122 calculates the difference amount by counting up all the pixels to check whether or not the data values are different between the previous screen and the update screen. The total sum of the pixels where the data values between the both screens are different in the entire screen counted by the counter 122 is taken as the difference amount. The update signal outputting section 123 outputs an update signal when the count value is equal to or larger than a threshold value, but does not output the update signal when the count values is less than the threshold value.

Figure 15:
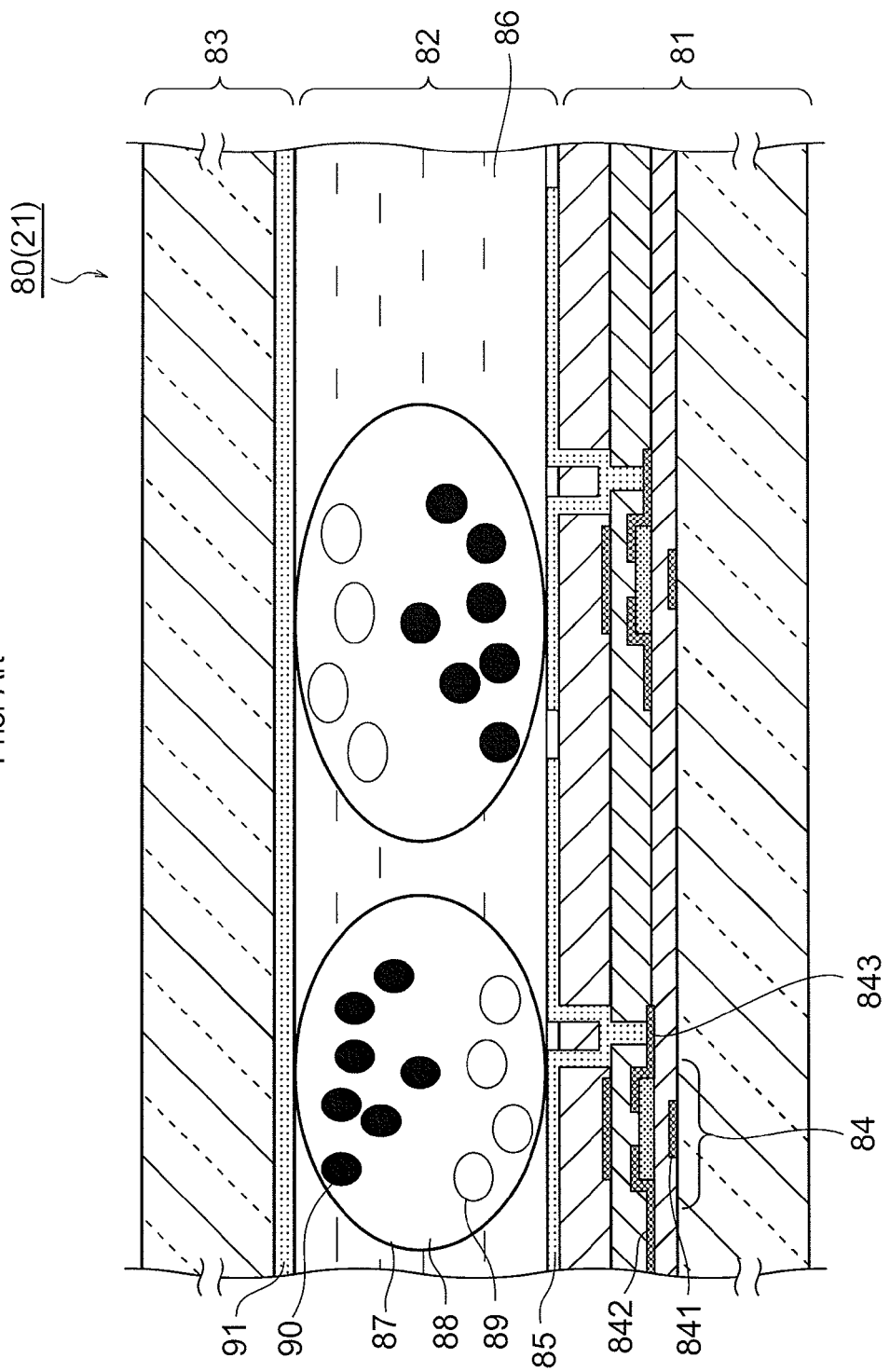
FIG. 15 is a schematic sectional view showing a display unit of an electronic paper display.

FIG. 4 is an illustration showing the electrical structure of the main part of the display unit 21 and the data driver 23 of FIG. 1. As shown in FIG. 4, the display unit 21 is configured with the scan lines 211, - - -, 211, the data lines 212, - - -, 212, TFTs 84, - - -, 84, and the electrophoresis display elements 213, - - -, 213. As shown in FIG. 4 and FIG. 15, in the display unit 21, a gate electrode 841 of each TFT 84 is connected to the corresponding scan line 211, and a source electrode 842 is connected to the corresponding data line 212. Further, a pixel electrode 85 is connected to a drain electrode 843 of each TFT 84, and the electrophoresis display element 213 is disposed between the pixel electrode 85 and a counter electrode 91.

As shown in FIG. 4, the data driver 23 is configured with a selection signal generating circuit 231 and a voltage section circuit 232. The voltage selection circuit 232 is configured with transistors 232a, 232b, and 232c. With this data driver 23, the transistor 232b comes to an on state when the data signal da is "00" or "11", and a driving voltage (applied voltage) of 0 V is outputted to the data line 212. Further, the transistor 232a comes to an on state when the data signal da is "01", and a driving voltage of +15 V (black writing voltage) is outputted to the data line 212. Furthermore, the transistor 232c comes to an on state when the data signal da is "10", and a driving voltage of −15 V (white writing voltage) is outputted to the data line 212.

Figure 5:
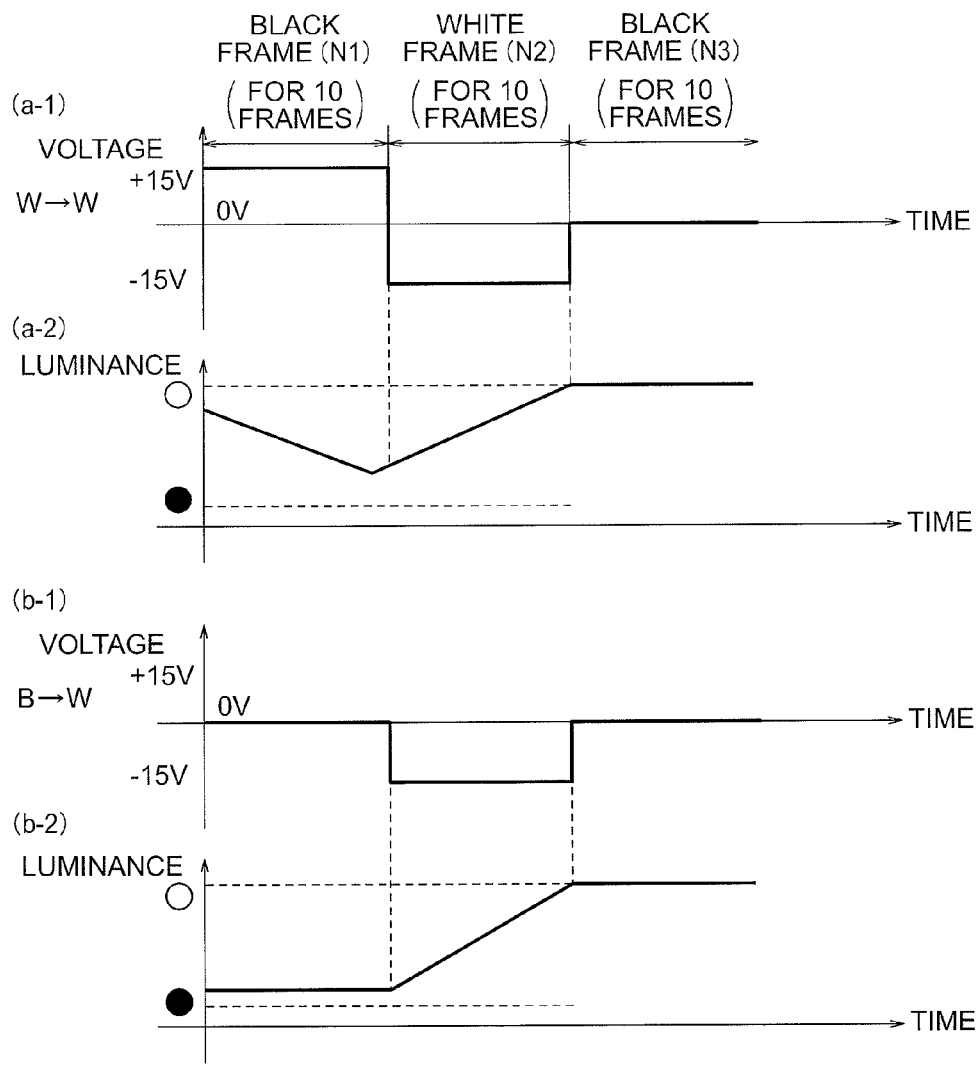
FIG. 5 is a first explanatory chart showing a driving method of the electronic paper display of the first exemplary embodiment.
Figure 6:
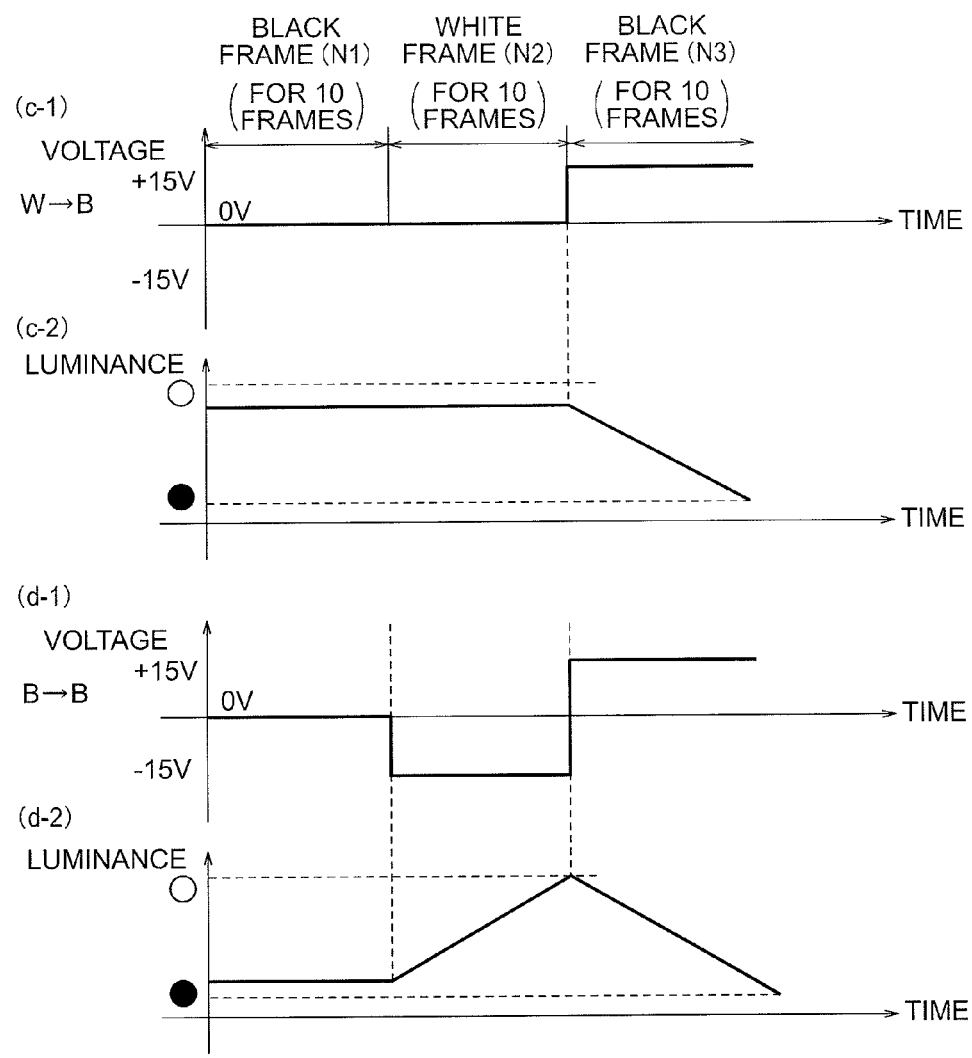
FIG. 6 is a second explanatory chart showing the driving method of the electronic paper display of the first exemplary embodiment.

The electrophoresis display element 213 exhibits the memory characteristic. Thus, it is necessary to apply the driving voltage of +15 V when making transition from white (W) to black (B), and to apply the driving voltage of −15 V when making transition from black (B) to white (W). In the meantime, when holding white (W) to white (W) and black (B) to black (B), it only needs to refresh the luminance of the previous white (W) or black (B). In that case, the luminance of white or black becomes deteriorated if the luminance is not refreshed, so that an afterimage of the previous screen is recognized on the display unit 21. Therefore, in a case of two-gradation type display, for example, it is necessary to apply a driving voltage of a proper waveform according to the previous screen data and the update screen data to the data line 212. FIG. 5-FIG. 7 are explanatory charts showing a driving method of the electronic paper display of FIG. 1. Hereinafter, the driving method of the electronic paper display will be described by mainly referring to FIG. 5-FIG. 7.

In graphs of FIG. 5 and FIG. 6, the lateral axis shows the time, and the longitudinal axis shows the voltage or the luminance. In the display unit 21 (FIG. 4), the electrophoresis display elements 213 (FIG. 4) are driven in 30 frames, for example, as shown in FIG. 5. Among the 30 frames, the first 10 frames are black frames (N1), the next 10 frames are white frames (N2), and the last 10 frames are black frames (N3). In (a-1) of FIG. 5, shown is the waveform of the driving voltage applied to the data line 212 (FIG. 4) when the previous screen is white (W) and the update screen is white (W). Meanwhile, in (a-2) of FIG. 5, shown is the state of luminance changes in the pixels in that state.

That is, in the first black frame (N1), the driving voltage of +15 V is applied to the data line 212 (FIG. 4) for the time of 10 frames for refreshing, so that the screen becomes black (B) once. In the next white frame (N2), the driving voltage of −15 V is applied to the data line 212 (FIG. 4) for the time of 10 frames for refreshing, so that the screen is refreshed to white (W) luminance. The screen is already being refreshed to the white luminance in the last black frame (N3), so that the driving voltage is not applied to the data line 212 (FIG. 4) but 0 V is applied.

The reason why refresh of the white luminance is required for the pixels where white (W) is held as being white (W) is that the white luminance of the previous screen is deteriorated in an image holding period, so that an afterimage phenomenon where the previous screen remains is generated unless the white luminance of the pixels and the luminance are matched when black (B) is switched to white (W). Further, the reason why the screen is once changed to black as in white (W)→black (B)→white (W) is that it is necessary to prevent the electrophoresis display elements 213 (FIG. 4) from being charged up because an unnecessary DC voltage is continuously applied when the update of the white luminance on the pixels continues, for example, unless the DC voltage is set to 0 V in the time accumulation of the entire driving waveform. For example, when the update of the white luminance on the pixels continues, the unnecessary DC voltage is continuously applied. Thus, the electrophoresis display elements 213 (FIG. 4) are charged up. To prevent it, the DC voltage is set to 0 V in the time accumulation of the entire driving waveform.

Next, in (b-1) of FIG. 5, shown is the waveform of the driving voltage applied to the data line 212 (FIG. 4) when the previous screen is black (B) and the update screen is white (W). Meanwhile, in (b-2) of FIG. 5, shown is the state of luminance changes in the pixels in that state. That is, in a case where black (B) is changed to white (W), the driving voltage is not applied to the data line 212 (FIG. 4) in the black frames (N1, N3) but the driving voltage of −15 V is applied for the time of 10 frames only in the N2 frame as the white frame. Thereby, the screen is changed from black (B) to white (W) during the N2 frame.

In that case, the DC voltage is not canceled in the time accumulation of the entire driving waveform. This is because the DC voltage can be canceled in a case where the previous screen is black (B), the update screen is white (W), and the next update screen is black (B) through setting the driving waveform thereafter changing from white (W) to black (B) to cancel the DC component with the driving waveform changing from black (B) to white (W) of (b-1) in FIG. 5. With this, it is no risk of having the unnecessary DC voltage continuously applied, unlike the case of the white luminance update.

Further, in (c-1) of FIG. 6, shown is the waveform of the driving voltage applied to the data line 212 (FIG. 4) when the previous screen is white (W) and the update screen is black (B). Meanwhile, in (c-2) of FIG. 6, shown is the state of luminance changes in the pixels in that state. In (d-1) of FIG. 6, shown is the waveform of the driving voltage applied to the data line 212 (FIG. 4) when the previous screen is black (B) and the update screen is black (B). Meanwhile, in (d-2) of FIG. 6, shown is the state of luminance changes in the pixels in that state.

In order to achieve the driving method described above, 2×2 LUT group WF(n) as shown in FIG. 7A is prepared for 128 frames, for example. Note here that the LUT group WF(n) is the LUT of the n-th frame, and n=0, 1, - - -, 127 in a case where there are 128 frames.

Figures 7A, 7B:
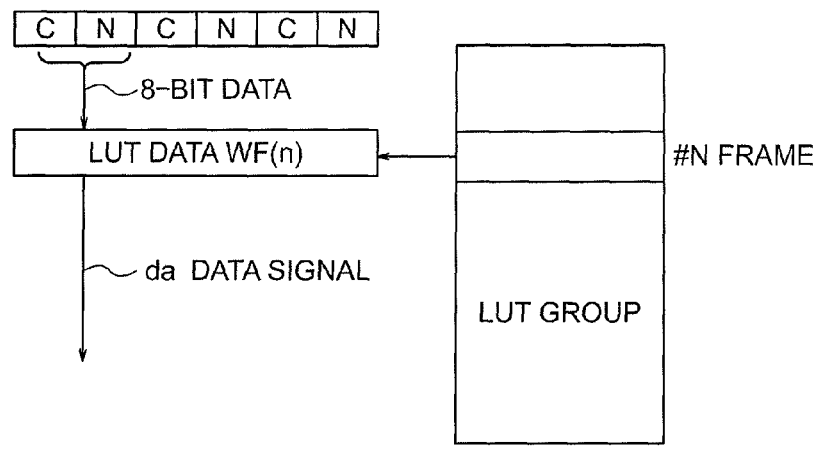
FIGS. 7A-7B are third explanatory charts showing the driving method of the electronic paper display of the first exemplary embodiment.

FIG. 7A shows a single lookup table WF(n), in which a row shows the gradation data of the pixel of the update screen and a column shows the gradation data of the pixel of the screen before the update. Data WF11, WF12, WF21, WF22 at the intersections between each row and column show "00" (=0 V), "10" (=−15 V), or "01" (=+15 V) of the data signal da.

In the black frame (N1) of the first 10 frames, +15 V is applied to the pixels of white (W)→white (W) as in (a-1) of FIG. 5, 0 V is applied to the pixels of black (B)→white (W) as in (b-1) of FIG. 5, 0 V is applied to the pixels of white (W)→black (B) as in (c-1) of FIG. 6, and 0 V is applied to the pixels of black (B)→black (B) as in (d-1) of FIG. 6. Therefore, the WF11(n) of the n-th frame, for example, in the 0-th to the tenth frames become WF11(0 to 9)="00", WF12(0 to 9)="00", WF21(0 to 9)="00", and WF22(0 to 9)="01".

In the white frame (N2) of the next 10 frames, −15 V is applied to the pixels of white (W)→white (W), −15 V is applied to the pixels of black (B)→white (W), 0 V is applied to the pixels of white (W)→black (B), and −15 V is applied to the pixels of black (B)→black (B). Therefore, the WF11(n) of the n-th frame, for example, in the tenth to the nineteenth frames become WF11(10 to 19)="10", WF12(10 to 19)="10", WF21(10 to 19)="00", and WF22(10 to 19)="10". In the black frame (N3) of the last 10 frames, 0 V is applied to the pixels of white (W)→white (W), 0 V is applied to the pixels of black (B)→white (W), +15 V is applied to the pixels of white (W)→black (B), and +15 V is applied to the pixels of black (B)→black (B). Therefore, the WF11(n) of the n-th frame, for example, in the twentieth to the twenty-ninth frames become WF11(20 to 29)="00", WF12(20 to 29)="00", WF21(20 to 29)="01", and WF22(20 to 29)="01".

Then, as shown in FIG. 7B, the driver data (the data signal da) is calculated by a driver data calculating module within the driving section 13 (FIG. 2). That is, 8-bit data (set of C and N) of Current (4-bit)/Next (4-bit) acquired by synthesizing the pixel data of the previous screen and the pixel data of the update screen read out from the screen information data is converted into the data signal da by using WF(n) that is the n-th frame LUT read out from the LUT group. For example, WF11(n) is read out in a case where the previous screen is white and the latter screen is white, WF12(n) is read out in a case where the previous screen is white and the latter screen is black, WF21(n) is read out in a case where the previous screen is black and the latter screen is white, and WF22(n) is read out in a case where the previous screen is black and the latter screen is black.

In the data driver 23 (FIG. 4), the value such as "00" within WF11(n) is converted to a voltage value. The operations described above are performed for each pixel of the screen for 30 frames, for example. The explanations provided heretofore are the case where the screen is of two gradations. However, the same operations are performed in a case of sixteen gradations by expanding the LUT to 16×16 matrix.

Figure 8:
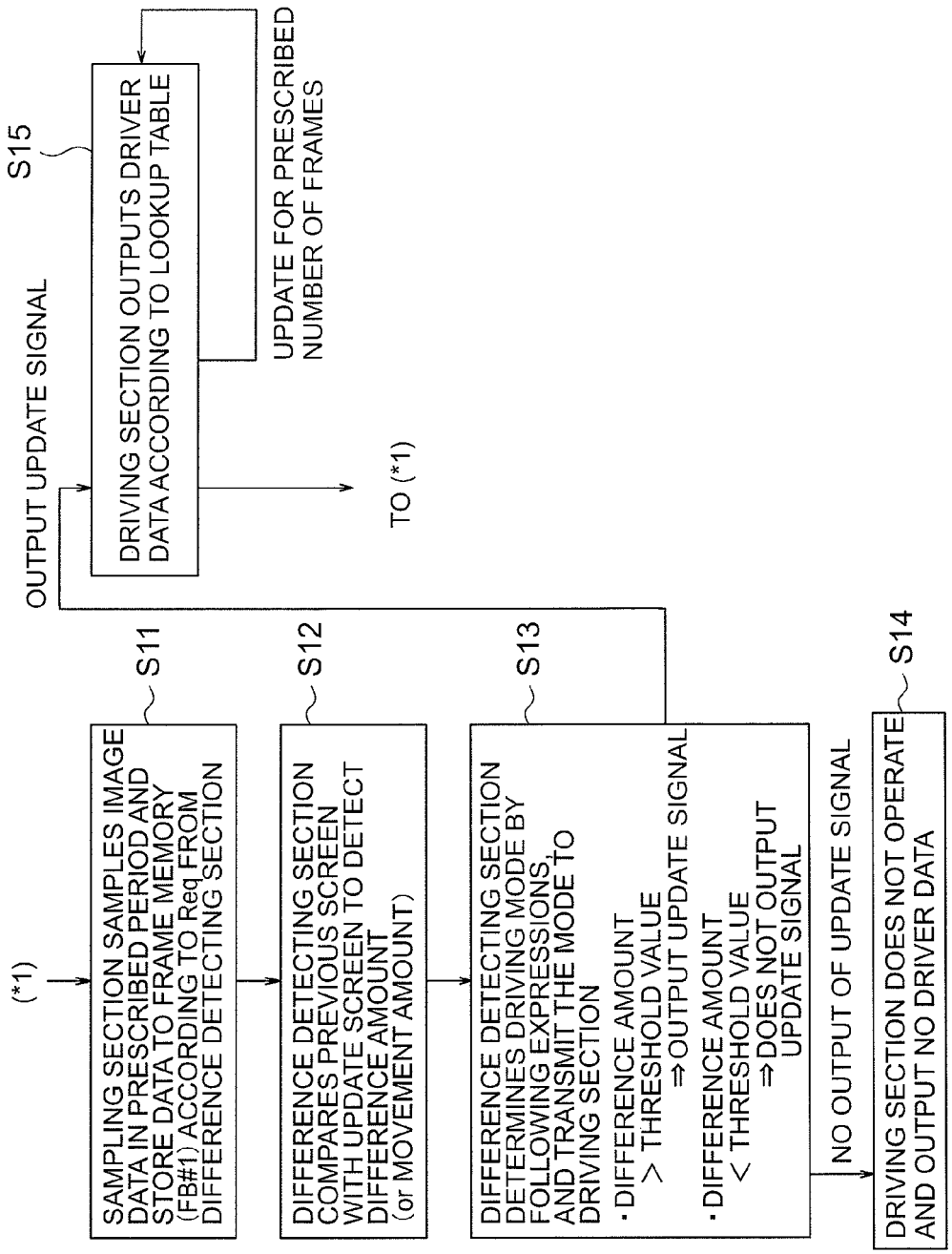
FIG. 8 is a sequence chart showing operations of the display controller of the first exemplary embodiment.

FIG. 8 is a sequence chart showing the operations of the display controller shown in FIG. 2. Hereinafter, explanations will be provided by referring to FIG. 2 and FIG. 8.

First, the sampling section 11 samples the transmitted image data in a prescribed period, and stores the image data to the frame memory 16 (region FB#1) (step S11). Subsequently, the difference detecting section 12 compares the previous screen with the update screen based on the Req signals from the sampling section 11 to detect the difference amount (or the movement amount) (step S12). Then, the difference detecting section 12 determines the driving mode by using following expressions to determine whether or not to transmit the update signal to the driving section 13 (step S13).

Difference amount≥threshold value 1⇒output update signal

Threshold value 1>difference amount⇒do not output update signal

The driving section 13 starts the operation upon receiving the update signal to output the driver data and generate the control signal (step S15). When the update signal is not received, the driving section 13 does not start the operation. Thus, the driving section 13 does not output the driver data in that case (step S14).

For setting the proper threshold value 1, it may be set with 10 pix (pixels) when the character is of 10 pt (points), for example. It is because the screen becomes updated for a noise in a case where "the threshold value 1=0".

Detection of the difference amount in the above explanations may be detection of the movement amount that may be used in moving picture compensation. The resolution of the input image and the resolution of the display unit 21 may be different. For example, in a case where the input image is VGA (640×480) and the resolution of the display unit 21 is UXGA (1600×1200), the difference detection and update judgment are done with the VGA screen, and the image can be expanded and outputted as UXGA when it is judged to update the screen.

Further, in order to prevent the screen update by the noise, following processing may be executed. That is, leveling processing and filtering processing for eliminating high-frequency components are executed on the input image, and detection of the difference amount is conducted on the filtered screen. When the difference amount is larger than the threshold value, the screen update is executed. In this case, the screen update is executed by the input image data that has not been filtered.

Next, a power sequence of the first exemplary embodiment will be described by referring to FIG. 1.

The entire operations of the image display device 30 will be described form the viewpoint of the power sequence. In the sequence, three periods of a sampling period of a specific time interval (1 Hz, for example), an image holding period, and an image update period when updating the image are repeated. Management of those is executed by the power supply management section 33.

The electrophoresis display elements configuring the display unit 21 exhibit the memory characteristic. Thus, in the image holding period, the circuits regarding display do not need to operate. Therefore, in the image holding period, the powers of the display controller 10, the frame memory 16, and the display power supply circuit 34 for supplying the power to each driver are in an off state or the circuits thereof are in a sleep state.

Then, the power supply management section 33 turns on the power or wakes up the display controller 10 and the frame memory 16 in every sampling period that comes at a prescribed time interval. At this time, in the display controller 10, at least the sampling section 11 is started up to start reception of the image data upon receiving a start signal (a vertical synchronous signal such as Vsync, for example) of the image data to write the data of one screen (one frame) to the frame memory 16. Then, the difference detecting section 12 of the display controller 10 stores the previous screen data stored in a nonvolatile memory (not shown), for example, to the frame memory 16, and performs detection of the difference between the current screen and the previous screen. When the difference amount is equal to or larger than the threshold value, the period is shifted to the image update period after storing the screen data of the current screen to the nonvolatile memory. When the difference amount is less than the threshold value, the period is shifted to the image holding period.

In the image update period, the power of the display controller 10, the frame memory 16, and the display power supply circuit 34 comes to be in an on state, so that the entire circuit wakes up. Then, the driving section 13 of the display controller 10 calculates the driver data from the LUT data and image data read from the frame memory 16, and outputs the data signal (the driver data) to the data driver 23. In a case where update of one screen is not completed after the data signal is outputted from the driving section 13, calculation and output of the driver data are repeated further. After the operations described above are performed for a driving period, the power for display is turned to an off state, and the processing is returned to the step of the image holding period.

As described above, the sampling period (1 Hz) of the sampling section 11 is slower than the frame rate (60 Hz) of the image data, so that the merit of the electronic paper display 20, i.e., super low consumption, can be maintained even when the image data is continuously inputted. It is because the image holding period other than the sampling period and the image update period is in a power-off state or on a sleep state except the power supply management section 33, and the display power supply circuit 34 is turned off also in the sampling period. This is different from a case where the frame rate of the input image and the sampling period match with each other as in the case of a moving picture processing circuit of a typical liquid crystal display device.

Through the above, with the first exemplary embodiment, the screen data is captured and sampled in a prescribed period for the image data transmitted continuously, and judgment is made whether or not to perform rewriting autonomously. Thus, there is no risk of having the screen switched in a blinking manner when the screen of a same content is to be displayed. Therefore, the user does not misunderstand that the screen is switched. Further, in a case where the filtering processing is executed for the noise, it is possible to prevent the screen from being updated wrongfully.

As an exemplary advantage according to the invention, it is possible to avoid screen update by the same image data as the previous image data through determining to update the screen by latter image data when a difference amount showing the difference between two pieces of consecutively inputted image data is equal to or larger than the threshold value. This makes it possible to prevent insertion of unnecessary refresh screen in the electronic paper display, so that it is possible to dissipate such problem of displaying a same image in a blinking manner. Therefore, it is possible to display an image properly on the electronic paper display even when the image data is transmitted continuously from the host of the existing LCD display system, for example.

Figure 9:
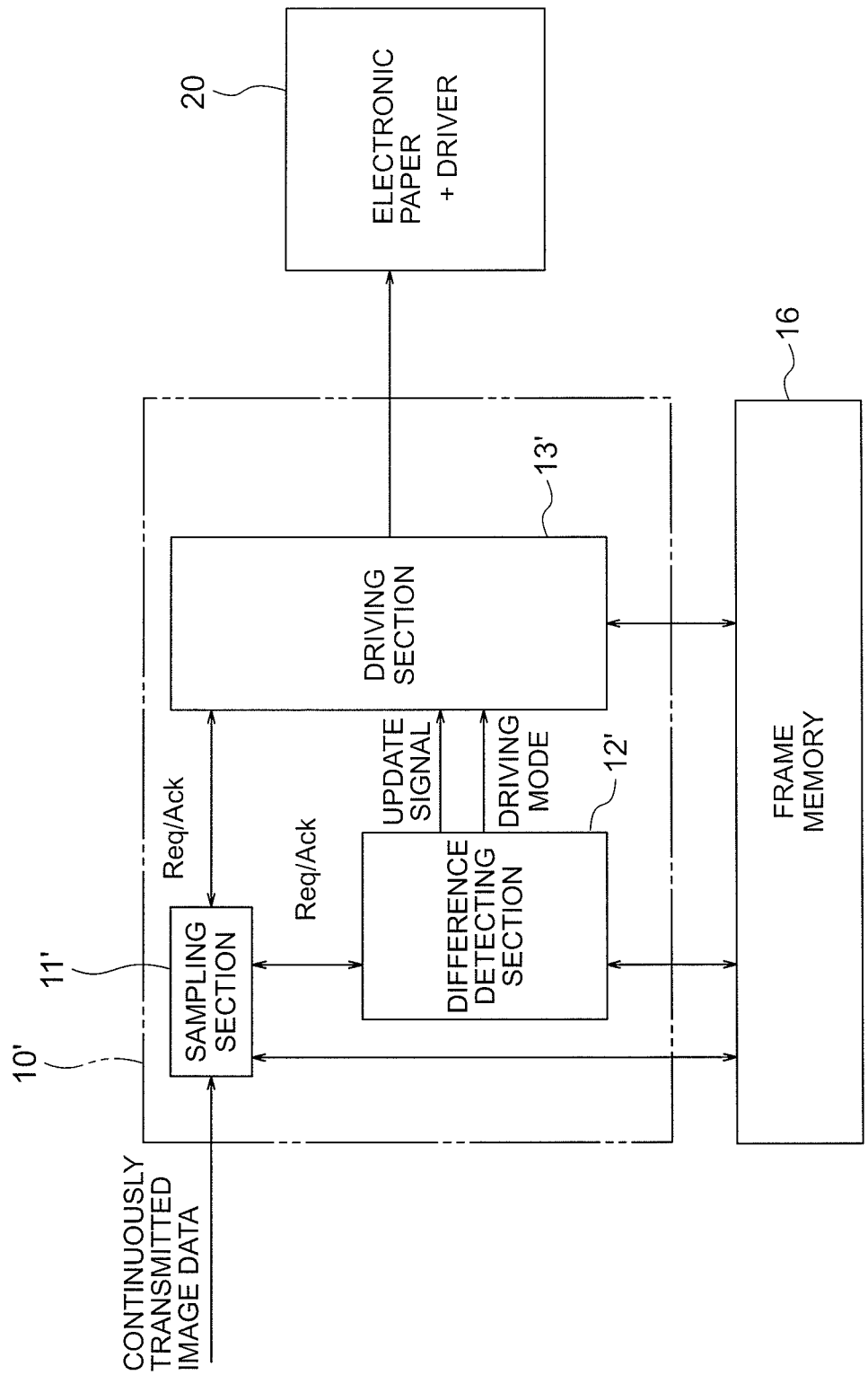
FIG. 9 is a block diagram showing a display controller of a second exemplary embodiment.
Figure 10:
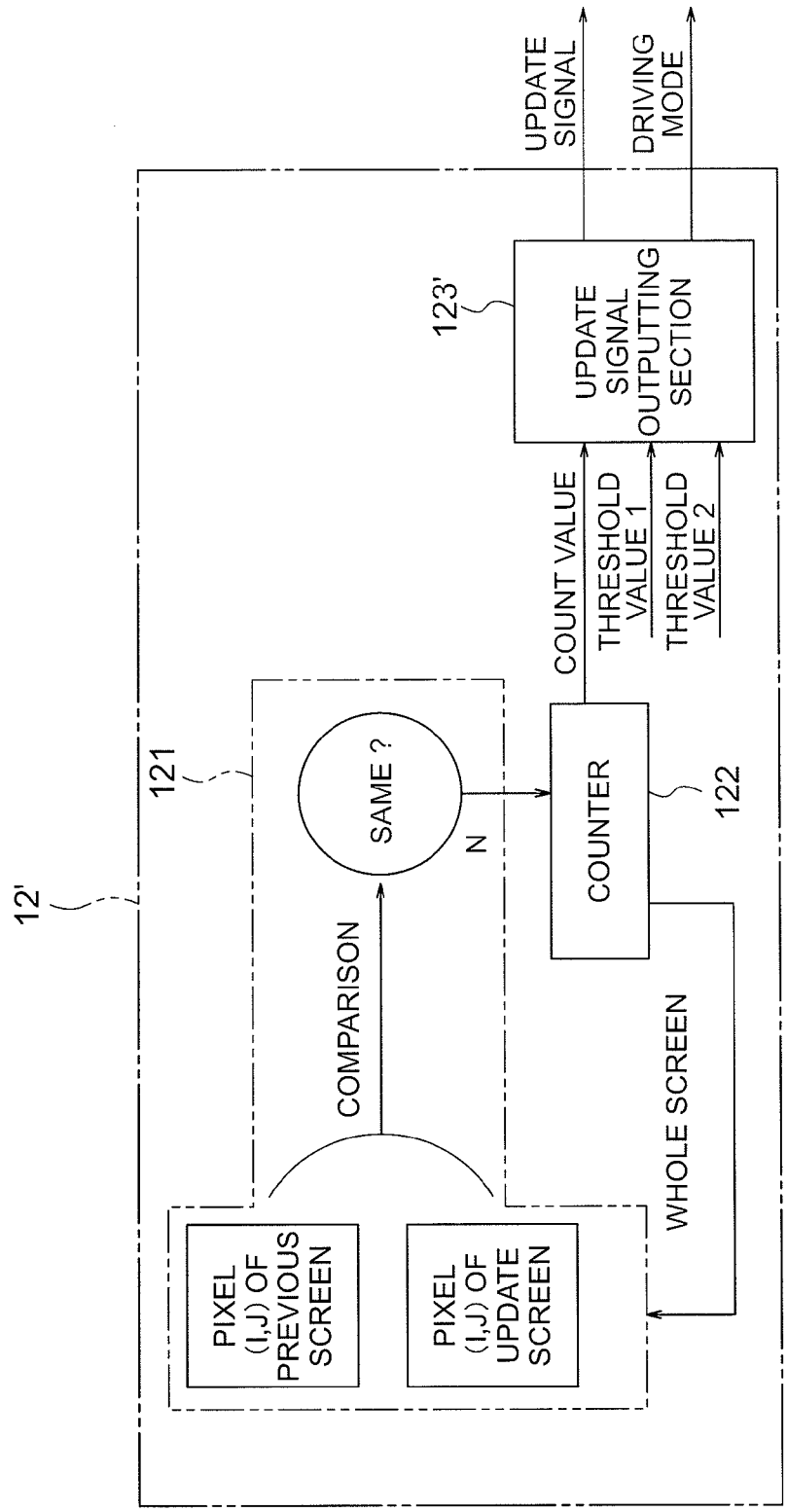
FIG. 10 is a block diagram showing a difference detecting section of the second exemplary embodiment.
Figure 11:
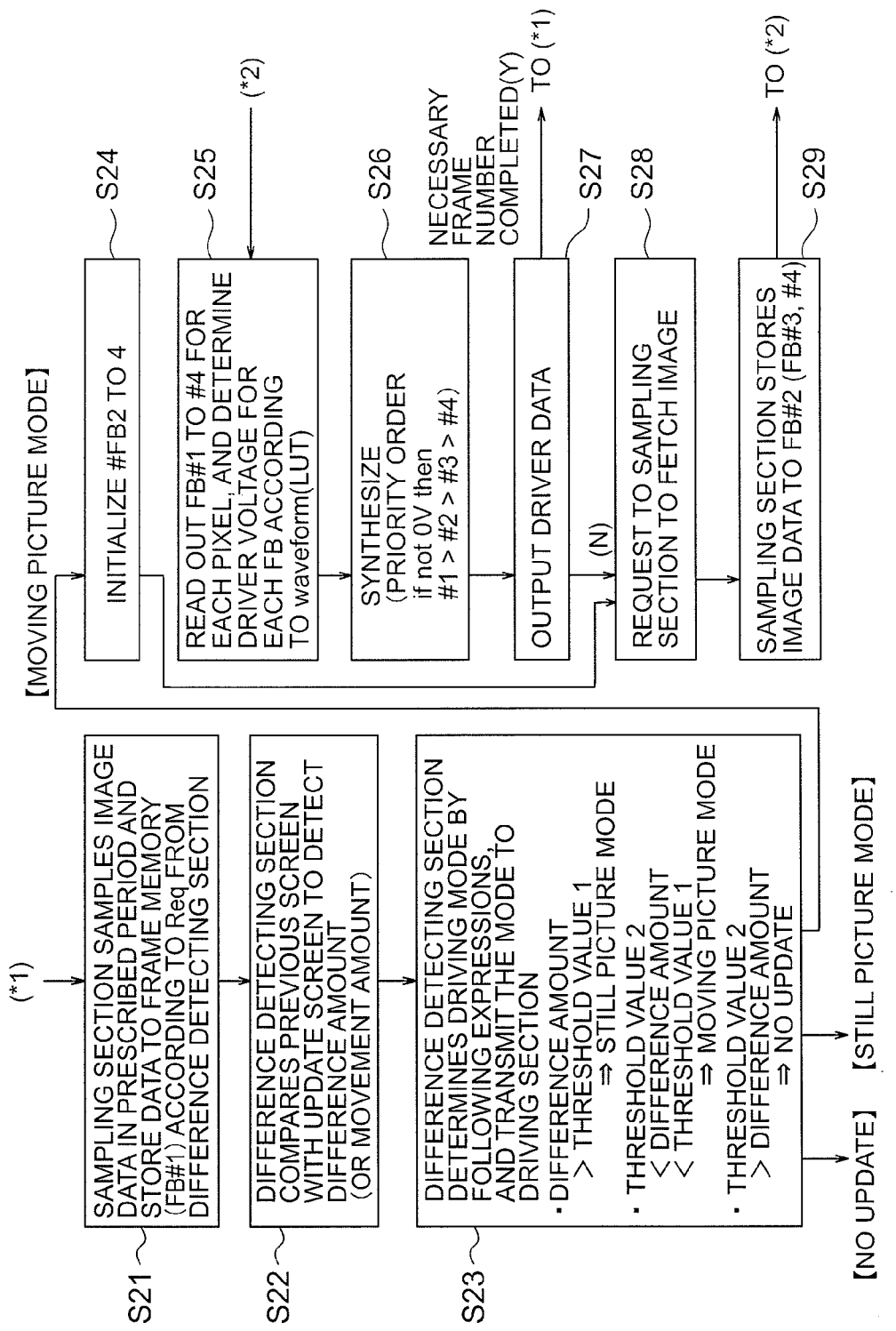
FIG. 11 is a sequence chart showing operations of the display controller of the second exemplary embodiment.

FIG. 9 is a block diagram showing a display controller according to a second exemplary embodiment. FIG. 10 is a block diagram showing a difference detecting section of FIG. 9. FIG. 11 is a sequence chart showing operations of the display controller according to the second exemplary embodiment. Hereinafter, the second exemplary embodiment will be described by referring to FIG. 9-FIG. 11.

The threshold value of the difference amount in the second exemplary embodiment is configured with a threshold value 1 (a first threshold value) and a threshold value 2 (a second threshold value) which is smaller than the threshold value 1. As shown in FIG. 9, the display controller 10' as the image display control device of the second exemplary embodiment includes a sampling section 11', a difference detecting section 12', and a driving section 13'. As shown in FIG. 10, the difference detecting section 12' includes a comparing section 121, a counter 122, and an update signal outputting section 123'.

The difference detecting section 12' judges that the latter image data is a still picture when the difference amount is equal to or larger than the threshold value 1, and instructs the driving section 13' to generate a driving signal corresponding to the still picture. The difference detecting section 12' judges that the latter image data is a moving picture when the difference amount is less than the threshold value 1 and equal to or larger than the threshold value 2, and instructs the driving section 13' to generate a driving signal corresponding to the moving picture.

At this time, the driving section 13' may instruct the sampling section 11' to input a specific number of pieces of image data even in a prescribed period when generating the driving signal corresponding to the moving picture. The sampling section 11' upon receiving that instruction may synthesize a plurality of pieces of inputted image data, and may generate the driving signal for the synthesized image data.

Further, when the applied voltage for each pixel configuring the screen is determined based on the image data, the applied voltage for each pixel according to the synthesized image data may be considered as values according to the earliest inputted image data that is not "0" among a plurality of applied voltages by the plurality of pieces of image data to be synthesized. With the display controller 10' of the second exemplary embodiment, it is possible to improve the visibility of the moving picture in addition to achieving the same operations and effects as those of the display controller 10 (FIG. 2 and the like) of the first exemplary embodiment. Other structures of the display controller 10' of the second exemplary embodiment are the same as those of the display controller (FIG. 2 and the like) of the first exemplary embodiment. Hereinafter, the display controller 10' will be described in more details.

The sampling section 11' samples the continuously transmitted image data in 1 s (second) period, for example, and fetches the data into the frame memory 16. The comparing section 121 and the counter 122 of the difference detecting section 12' receive a Req signal from the sampling section 11', and detect the number of pixels exhibiting a difference between the fetched image data (the latter image data) and the image data (previous image data) of the previous screen over the entire screen. Subsequently, the update signal output section 123' of the difference detecting section 12' compares the difference amount configured with the number of pixels with the two preset threshold values 1 and 2 to execute following judgment.

Difference amount is equal to or larger than threshold value 1 ⇒ still picture mode Difference amount is less than threshold value 1 and equal to or larger than threshold value 2 ⇒ moving picture mode Difference amount is less than threshold value 2 ⇒ not updated The update signal outputting section 123' outputs the screen update signals and the driving mode to the driving section 13' when it is judged as the still picture mode and the moving picture mode. Meanwhile, when it is judged as "not updated", the update signal outputting section 123' does not output those signals to the driving section 13'.

The driving section 13' starts the operation upon receiving the update signal from the difference detecting section 12', reads out the image data (the previous image data) of the previous screen and the image data of an update image (the latter image data) from the frame memory 16, determines the driving waveform corresponding to those image data based on the lookup table data, generates the driver data (driving signal), and generates control signals (driving signals) of the data driver 23 (FIG. 1) and the gate driver 22 (FIG. 1). In a case of the moving picture mode, the driving section 13' sets a new sampling period minutely in addition to the normal sampling period, requests the sampling section 11' to fetch the image data at the time of new sampling, performs the same processing also on the newly fetched image data, and updates the driver data also at the time of the new sampling.

Next, operations of the display controller 10' will be described by referring to FIG. 9 and FIG. 11. First, the sampling section 11' samples the transmitted image data in a prescribed period, and stores the image data to the region FB#1 of the frame memory 16 according to a Req signal from the difference detecting section 12' (step S21). Subsequently, the difference detecting section 12' compares the previous screen with the update screen to detect the difference amount (or the movement amount) (step S22). Then, the difference detecting section 12' determines the driving mode by using following expressions, and outputs the result to the driving section 13' (step S23).

Difference amount≥threshold value 1 ⇒ still picture mode

Threshold value 2≤difference amount<threshold value 1 ⇒ moving picture mode

Threshold value 2>difference amount ⇒ not updated

In a case of the still picture mode and "not updated", the driving section 13' operates in the same manner as that of the first exemplary embodiment. In the meantime, in a case of the moving picture mode, the driving section 13' initializes the regions #FB2 to #FB4 of the frame memory 16 (step S24), and requests the sampling section 11' to fetch the image data in a still shorter period (step S28). The sampling section 11' stores the image data to the regions #FB2 to #FB4 in the fetched order (step S29). Subsequently, the processing is advanced to (*2), and the driving section 13' reads out the image data from the regions FB#1 to FB4 for each pixel, and determines the driving voltage for each of the regions FB#1 to FB4 according to the driving waveform LUT (step S25). Then, the driving section 13' synthesizes those image data according to a priority order (if not 0 V then #1>#2>#3>#4) (step S26). Note here that "if not 0 V then #1>#2>#3>#4" means to employ the driving voltage corresponding to the earliest input region, which is not 0 V, out of the driving voltages corresponding to the regions FB#1 to FB4. Subsequently, the driving section 13' outputs the driver data (step S27). Then, when the processing for the necessary frame number is completed (Y), the procedure is advanced to (*1).

When the processing for the necessary frame number is not completed, the procedure advances to step S28. In step S22, the movement amount by the moving picture compensation may be detected instead of detecting the difference amount.

Figure 12:
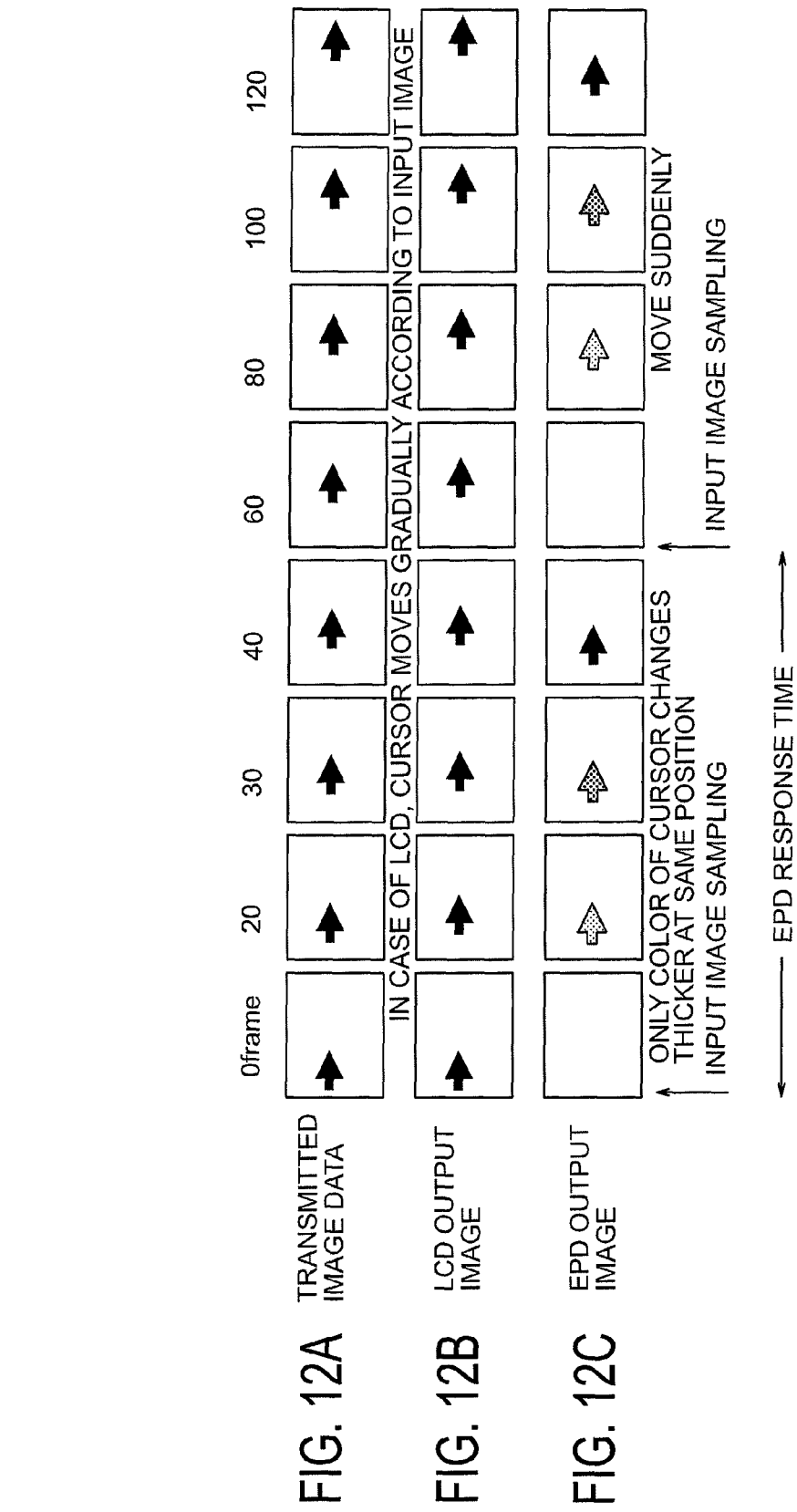
FIGS. 12A-12C are first explanatory charts showing a driving method of the electronic paper display of the second exemplary embodiment.
Figure 13:
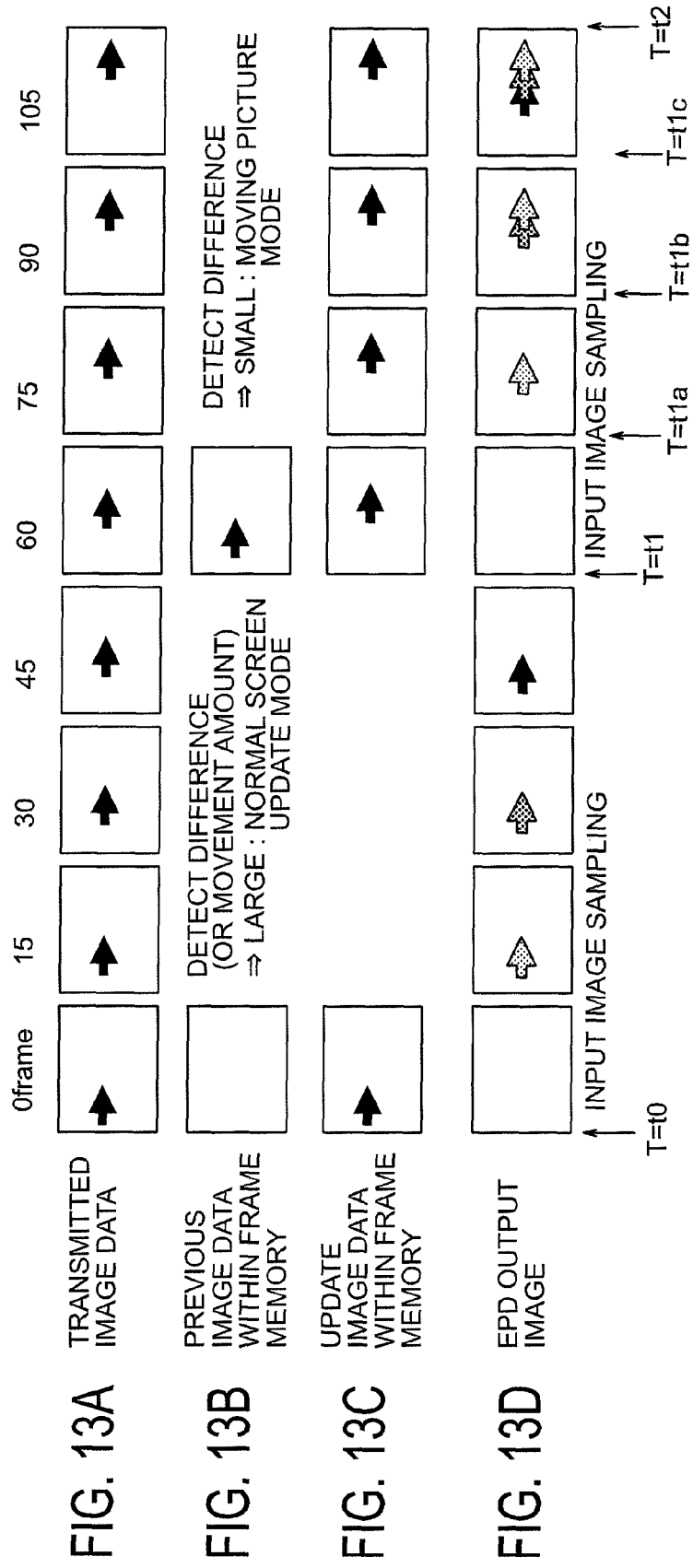
FIGS. 13A-13D are second explanatory charts showing the driving method of the electronic paper display of the second exemplary embodiment.
Figure 14:
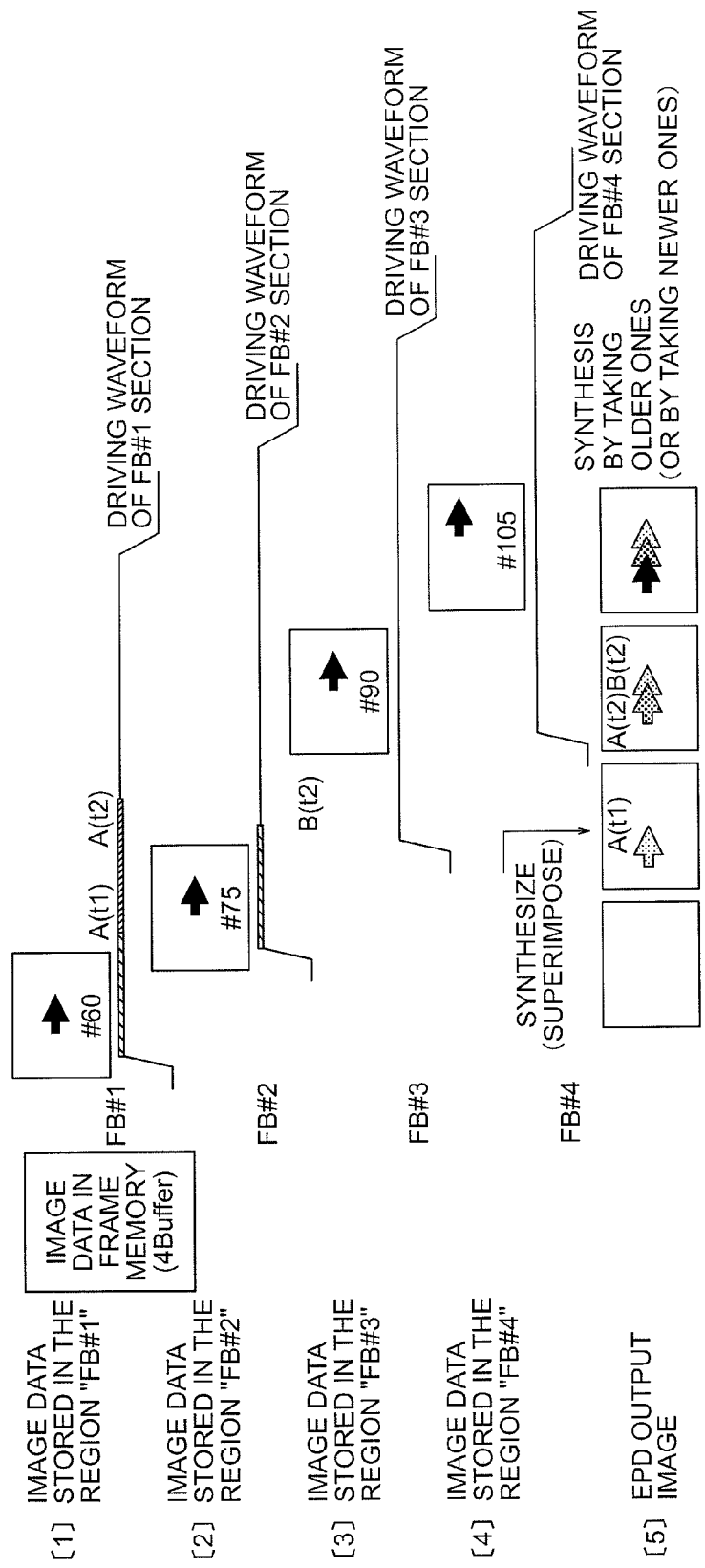
FIG. 14 is a third explanatory chart showing the driving method of the electronic paper display of the second exemplary embodiment.

FIG. 12-FIG. 14 are explanatory charts showing a driving method of the electronic paper display according to the second exemplary embodiment. Hereinafter, explanations will be provided by referring to those drawings. Note that EPD (Electrophoretic Display) is an abbreviation of the electronic paper display.

First, the background of the second exemplary embodiment will be described by referring to FIGS. 12A-12C. There is considered a case where the image data is sampled in a prescribed period for the image data (FIG. 12A) transmitted continuously and the screen is updated (FIG. 12C). About 1 second (60 Hz, 60 frames) is required for updating the screen of the electronic paper display. In a case of a cursor of a mouse or the like, it stays in a prescribed time, for example, and the color becomes thicker. Then, after 60 frames, the cursor suddenly moves to the position of after 60 frames. Thus, there is an uncomfortable feeling of the so-called non-smoothness (an uncomfortable feeling of viewing a frame-to-frame display) (FIG. 12C). In a case of a liquid crystal display device, acquired is a display as shown in FIG. 12B, since the frame rate of the input image and the sampling period match with each other.

Therefore, a drive mode different from that of the still picture is necessary for updating the moving-picture screen such as the case of the mouse. Further, it is preferable to be able to automatically switch the moving picture mode and the still picture mode. The reason for not using the moving picture mode for all the cases is that the moving picture mode is not preferable for the still picture. That is, as will be described later, it is because the moving picture mode is an overwriting mode, so that the so-called "tailing" is generated.

Thus, the second exemplary embodiment is designed to sample the image data transmitted continuously from the host (PC) in every prescribed period, detect the difference amount (or the movement amount) with respect to the previous screen at the time of sampling, compare the difference amount with the two proper threshold values 1 and 2, and make judgment as follows. For the moving picture mode, additional image sampling is conducted in addition to the normal image sampling.

Difference amount is equal to or larger than threshold value 1 ⇒ still picture mode Difference amount is less than threshold value 1 and equal to or larger than threshold value 2 ⇒ moving picture mode Difference amount is less than threshold value 2 ⇒ not updated Next, details of the moving picture mode according to the second exemplary embodiment will be described by using FIGS. 13A-13D. In FIG. 13, the first row (FIG. 13A) shows the image data transmitted to the display controller 10' (FIG. 9) when the time is taken as the lateral axis, which shows a case where the cursor of the mouse moves. The mouse is clicked at T=t0. Thus, at T<t0, the cursor is not shown, while the cursor appears in the image data at T=t0. Then, the cursor moves to the right in a period of T=t0 to t2.

The second row (FIG. 13B) shows the image data of the previous screen within the frame memory 16 (FIG. 9), and the third row (FIG. 13C) shows the image data of the update screen within the frame memory 16 fetched at T=t. The display controller 10' (FIG. 9) fetches the image data of the update screen at T=t, and then compares it with the image data of the previous screen. When the difference amount (the total sum of the different pixels on the both data over the entire screen) between the previous screen and the update screen is larger than the threshold value 1 that is set in advance, completely different screens are to be displayed. Thus, the still picture mode is employed. In the meantime, when the difference amount is smaller than the threshold value 1 and larger than the threshold value 2, it is judged that the screen changes gradually. Thus, the moving picture mode is employed.

The fourth row (FIG. 13D) shows an image of the output screens of the display unit 21 (FIG. 1). In FIGS. 13A-13D, at T=t0, the cursor appears. Thus, the still picture mode is selected. At T=t1, only the cursor is moving. Thus, the moving picture mode is selected. Further, in a period of T=t0 to t1, the still picture mode is employed. Thus, the update screen gradually emerges in a statical manner. That is, the cursor of the mouse gradually emerges at the same position. In the meantime, the moving picture mode is selected at T=t1.

In the moving picture mode, new image samplings t=t1a, t=t1b, and t=t1c are added between the normal input samplings t=1 and t=2. The sampling period for inputting the additional images may be set shorter than the response time of the display unit 21 (FIG. 1). In the new sampling, executed is only fetching of the image data, and no judgment on driving according to the difference amount is done. Each of the newly fetched image data is fetched into different regions of the frame memory 16 (FIG. 9). The frame memory 16 (FIG. 9) holds each of the image data, so that each image data can be synthesized. Thus, it is possible to overwrite and display the screens newly fetched at T=t1a, T=t1b, and T=t1c while displaying the screen of the previous sampling (T=t1). This makes it possible to achieve smooth shift even though there is tailing of the cursor of the mouse being generated. Therefore, the instant responsiveness can be improved compared to the still picture mode.

Next, an image data synthesizing method will be described. In FIG. 14, the lateral axis is the time. Further, the first row ((1) of FIG. 14) shows the image data stored in the region FB#1 of the frame memory 16 (FIG. 9) sampled at T=t1 (FIGS. 13A-13D). The second row ((2) of FIG. 14) shows the image data stored in the region FB#2 of the frame memory 16 (FIG. 9) sampled at T=t1a (FIGS. 13A-13D). The third row ((3) of FIG. 14) shows the image data stored in the region FB#3 of the frame memory 16 (FIG. 9) sampled at T=t1b (FIGS. 13A-13D). The fourth row ((4) of FIG. 14) shows the image data stored in the region FB#4 of the frame memory 16 (FIG. 9) sampled at T=t1c (FIGS. 13A-13D). The fifth row ((5) of FIG. 14) shows the output image of EPD.

Each of the image data stored in the regions FB#1 to FB#4 is converted to the driving waveform according to the lookup tables set for each of the regions. The method for converting to the driving waveforms is the same as that of the first exemplary embodiment, so that explanations thereof are omitted.

As the driving voltage contained in the outputted driving waveform, there are four driving voltages of VFB#1, VFB#2, VFB#3, and VFB#4 by corresponding to each of the regions for each pixel. Among those, the driving voltage, which is not 0 V, in the priority order of FB#1>FB#2>FB#3>FB#4, i.e., the pixel voltage data fetched in the earliest order, is prior to others as the final pixel voltage data (applied voltage).

For example, when the driving voltages of the pixel (I, J) are VFB#1=0 V, VFB#2=15 V, VFB#3=−15 V, and VFB#4=0 V, "VFB#2=15 V" is the final output driving voltage. Thereby, it is possible to overwrite and display the newly fetched screen at T=t1a, T=t1b, T=t1c over the position of the cursor of the new mouse even though the previous screen data emerges gradually. This makes it possible to achieve smooth shift even though there is tailing of the cursor of the mouse being generated. Therefore, the instant responsiveness can be improved compared to the still picture mode.

In the second exemplary embodiment, the priority order of the driving voltages that are not 0 V is set as FB#1>FB#2>FB#3>FB#4. However, the priority order may be set as FB#1<FB#2<FB#3<FB#4 or may be set in other orders, even though the viewed grade on the display may become different.

In other words, the present invention has the following structures.

(1) The present invention is a display device which includes: a display controller having a sampling section that samples continuously transmitted image data by every prescribed period and a difference detecting section that determines whether or not to perform update based on a difference value (or a movement amount) between a previous image and an update image; and an electronic paper display. Further, whether or not to update the display is determined as follows.

Difference amount≥threshold value⇒ update
Difference amount<threshold value<⇒ do not update For determining the difference amount, the previous screen and the update screen are compared by each pixel to judge whether or not those are in a same gray scale. When those are different, a counter is count up. When the counter value in the entire screen is larger than the threshold value, update is conducted. When the counter value is smaller than the threshold value, update is not conducted.

(2) The present invention is a display device which includes: a display controller having a sampling section that samples continuously transmitted image data by every prescribed period and a difference detecting section that determines the driving mode based on a difference value (or a movement amount) between a previous image and an update image; and an electronic paper display. Further, whether or not to update the display is determined as follows.

Difference amount≥threshold value 1⇒ still picture mode
Threshold value 1≥difference amount>threshold value2
    ⇒ moving picture mode
Difference amount<threshold value 2⇒ do not update In the moving picture mode, additional sampling is conducted during the sampling of every prescribed period, and the image data acquired in a plurality of those periods are synthesized and outputted to the display unit.

(3) The image data synthesizing method is as follows, for example. For the image data fetched sequentially in each region of the frame memory within each of the sampling periods, the driving voltages are determined according to the respective LUTs. Further, for each pixel, among the driving voltages determined in each region of the respective frame memories, the driving voltages that are not 0 V and correspond to the region of the youngest number (i.e., fetched earliest) are synthesized as the final driving voltage.

In other words, the present invention achieves following effects.

(1) The image data transmitted continuously is captured and sampled in a prescribed period, and judgment on whether or not to perform rewriting autonomously is conducted. Thus, even with a system having an isolated host (PC), it is possible to avoid such inconvenience that the user misunderstand that the screen is switched because the screen becomes switched in a blinking manner when the same screens are displayed.

(2) For the image data transmitted continuously, the moving picture mode for regenerating the movement of the mouse and the like and the still picture mode are automatically judged for display. Thus, it is possible to avoid such inconvenience of displaying the moving picture non-smoothly, and any images can be displayed without causing an uncomfortable feeling.

While the present invention has been described by referring to each of the above-described exemplary embodiment, the present invention is not limited to each of those exemplary embodiments. Various changes occurred to those skilled in the arts can be applied to the structures and the details of the present invention. Further, it is to be understood that the present invention includes those that are formed by properly combining a part of or a whole part of the structures of each of the above-described exemplary embodiments.

A part of or a whole part of the above-described exemplary embodiments can be depicted as in following Supplementary Notes. Note, however, that the present invention is not limited only to the following structures.

(Supplementary Note 1) An image display control device which outputs a driving signal for screen display to an electronic paper display that displays a refresh screen before updating and displaying a screen, and the image display control device includes: a sampling section that inputs one piece of image data in every prescribed period from a plurality of continuously transmitted image data which corresponds to one screen of the electronic paper display; a difference detecting section that detects a difference amount showing a difference between previous image data and latter image data of two pieces of the consecutive image data inputted by the sampling section, and determines to perform screen update by using the latter image data when the difference amount is equal to or larger than a threshold value; and a driving section that generates the driving signal for the latter image data and outputs the driving signal to the electronic paper display when the screen update is determined by the difference detecting section.

(Supplementary Note 2) The image display control device depicted in Supplementary Note 1, wherein the difference detecting section compares a gray scale of the previous image data and a gray scale of the latter image data for each pixel configuring the screen, and takes number of the pixels where the two gray scales do not match with each other as the difference amount.

(Supplementary Note 3) The image display control device depicted in Supplementary Note 1 or 2, wherein: the threshold value includes a first threshold value and a second threshold value that is smaller than the first threshold value; and the difference detecting section judges that the latter image is a still picture when the difference amount is equal to or larger than the first threshold value, and instructs the driving section to generate the driving signal corresponding to the still picture, and judges that the latter image data is a moving picture when the difference amount is less than the first threshold value and equal to or larger than the second threshold value, and instructs the driving section to generate the driving signal corresponding to the moving picture.

(Supplementary Note 4) The image display control device depicted in Supplementary Note 3, wherein, when generating the driving signal corresponding to the moving picture, the driving section instructs the sampling section to input a prescribed number of pieces of the image data even in the prescribed period, synthesizes a plurality of the image data inputted by the sampling section upon receiving that instruction, and generates the driving signal for the synthesized image data.

(Supplementary Note 5) The image display control device depicted in Supplementary Note 4, wherein, when an applied voltage for each pixel configuring the screen is determined according to the image data, the applied voltage of each pixel according to the synthesized image data is a value according to the image data inputted earliest, which is not "0", among a plurality of applied voltages according to the plurality of pieces of image data to be synthesized.

(Supplementary Note 6) The image display control device depicted in any one of Supplementary Notes 1 to 5, wherein the electronic paper display is a type that uses a microcapsule-type electrophoresis display element.

(Supplementary Note 7) An image display device, which includes: the image display control device depicted in any one of Supplementary Notes 1 to 6; and the electronic paper display.

(Supplementary Note 8) An image display control method for outputting a driving signal for screen display to an electronic paper display that displays a refresh screen before updating and displaying a screen, and the image display control method includes: inputting one piece of image data in every prescribed period from a plurality of continuously transmitted image data which corresponds to one screen of the electronic paper display; detecting a difference amount showing a difference between previous image data and latter image data of two pieces of the consecutive input image data, and determining to perform screen update by using the latter image data when the difference amount is equal to or larger than a threshold value; and generating the driving signal for the latter image data and outputting the driving signal to the electronic paper display when the screen update is determined.

(Supplementary Note 9) The image display control method depicted in Supplementary Note 8, which includes, when detecting the difference amount, comparing a gray scale of the previous image data and a gray scale of the latter image data for each pixel configuring the screen, and taking number of the pixels where the two gray scales do not match with each other as the difference amount.

(Supplementary Note 10) An image display control program for causing a computer to function as a module which outputs a driving signal for screen display to an electronic paper display that displays a refresh screen before updating and displaying a screen, and the image display control program causes the computer to function as: a module that inputs one piece of image data in every prescribed period from a plurality of continuously transmitted image data which corresponds to one screen of the electronic paper display; a module that detects a difference amount showing a difference between previous image data and latter image data of two pieces of the consecutive input image data, and determines to perform screen update by using the latter image data when the difference amount is equal to or larger than a threshold value; and a module that generates the driving signal for the latter image data and outputs the driving signal to the electronic paper display when the screen update is determined.

INDUSTRIAL APPLICABILITY

The present invention can be utilized for an electronic paper display that displays a refresh screen before updating and displaying a screen.

What is claimed is:

1. An image display control device which outputs a driving signal for screen display to an electronic paper display that displays a refresh screen before updating and displaying a screen, the image display control device comprising:
a sampling section that inputs one piece of image data in every prescribed period from a plurality of consecutively transmitted image data which corresponds to one screen of the electronic paper display;

a difference detecting section that detects a difference amount showing a difference between previous image data and latter image data of two pieces of the consecutive image data inputted by the sampling section, and determines to perform screen update by using the latter image data when the difference amount is equal to or larger than a threshold value; and a driving section that generates the driving signal for the latter image data and outputs the driving signal to the electronic paper display when the screen update is determined by the difference detecting section, wherein the threshold value includes a first threshold value and a second threshold value that is smaller than the first threshold value; and the difference detecting section judges that the latter image data is a new still picture that is different from the previous image data when the difference amount is equal to or larger than the first threshold value, and instructs the driving section to generate the driving signal corresponding to the new still picture, and judges that the latter image data is a moving picture when the difference amount is less than the first threshold value and equal to or larger than the second threshold value, and instructs the driving section to generate the driving signal corresponding to the moving picture, and wherein when generating the driving signal corresponding to the moving picture, the driving section instructs the sampling section to input additional image data in the same prescribed period from the plurality of consecutively transmitted image data, synthesizes a plurality of the image data inputted by the sampling section upon receiving that instruction, and generates the driving signal for the synthesized image data.

2. The image display control device as claimed in claim 1, wherein when an applied voltage for each pixel configuring the screen is determined according to the image data, the applied voltage of each pixel according to the synthesized image data is a value according to the image data inputted earliest, which is not "0", among a plurality of applied voltages according to the plurality of pieces of image data to be synthesized.

3. The image display control device as claimed in claim 1, wherein the electronic paper display is a type that uses a microcapsule-type electrophoresis display element.

4. An image display device, comprising:

the image display control device claimed in claim 1; and
the electronic paper display.

5. The image display control device as claimed in claim 1, wherein the difference detecting section compares a gray scale of the previous image data and a gray scale of the latter image data for each pixel configuring the screen, and takes number of the pixels where the two gray scales do not match with each other as the difference amount.

* * * * *